United States Patent
Zhu et al.

(10) Patent No.: US 12,432,599 B2
(45) Date of Patent: Sep. 30, 2025

(54) MEASUREMENT REPORTING TIMING ADJUSTMENTS

(71) Applicant: QUALCOMM INCORPORATED, San Diego, CA (US)

(72) Inventors: Xipeng Zhu, San Diego, CA (US); Sharda Ranjan, Hyderabad (IN); Naga Chandan Babu Gudivada, Hyderabad (IN); Kuo-Chun Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 349 days.

(21) Appl. No.: 18/000,610

(22) PCT Filed: Jun. 30, 2021

(86) PCT No.: PCT/US2021/039913
§ 371 (c)(1),
(2) Date: Dec. 2, 2022

(87) PCT Pub. No.: WO2022/031389
PCT Pub. Date: Feb. 10, 2022

(65) Prior Publication Data
US 2023/0247461 A1    Aug. 3, 2023

(30) Foreign Application Priority Data
Aug. 1, 2020  (IN) .............................. 202041033119

(51) Int. Cl.
*H04W 24/10*    (2009.01)
*H04W 36/00*    (2009.01)

(52) U.S. Cl.
CPC ..... *H04W 24/10* (2013.01); *H04W 36/00838* (2023.05)

(58) Field of Classification Search
CPC ........... H04W 24/10; H04W 36/00838; H04W 36/0085; H04W 36/0088; H04W 88/06; H04W 76/28
See application file for complete search history.

(56) References Cited

U.S. PATENT DOCUMENTS

| | | |
|---|---|---|
| 9,860,804 B2 | 1/2018 | Wu et al. |
| 10,917,158 B2 | 2/2021 | Islam et al. |

(Continued)

FOREIGN PATENT DOCUMENTS

| | | |
|---|---|---|
| CN | 111432484 A | 7/2020 |
| EP | 2787759 A1 | 10/2014 |

(Continued)

OTHER PUBLICATIONS

International Search Report and Written Opinion—PCT/US2021/039913—ISA/EPO—Feb. 14, 2022.

(Continued)

*Primary Examiner* — Chuong A Ngo
(74) *Attorney, Agent, or Firm* — Holland & Hart LLP

(57) ABSTRACT

Methods, systems, and devices for wireless communications are described. Generally, a base station may configure a user equipment (UE) with a time to trigger (TTT) and a signal quality threshold. The UE may determine whether one or more conditions are satisfied, and if so, transmit an early measurement report or ignore a conflicting procedure that renders the measurements unavailable. In some examples, a UE may receive an indication of a minimum TTT in a configuration message with the TTT and the signal quality threshold. The UE may indicate an updated timing, to a base station, based on the minimum TTT. In some examples, the base station may determine that a UE is a multi-subscriber identification module (MSIM) UE, and may configure the duration of the TTT accordingly.

29 Claims, 17 Drawing Sheets

(56) References Cited

U.S. PATENT DOCUMENTS

| | | |
|---|---|---|
| 2008/0220784 A1 | 9/2008 | Somasundaram et al. |
| 2016/0112924 A1 | 4/2016 | Turakhia et al. |
| 2016/0174123 A1* | 6/2016 | Hedberg ............... H04W 36/22 370/331 |
| 2023/0199560 A1* | 6/2023 | Nuggehalli ....... H04W 28/0917 455/450 |

FOREIGN PATENT DOCUMENTS

| | | |
|---|---|---|
| EP | 3069552 A1 | 9/2016 |
| WO | WO-2015070208 | 5/2015 |
| WO | WO-2017091218 A1 | 6/2017 |
| WO | WO-2017204929 | 11/2017 |

OTHER PUBLICATIONS

Partial International Search Report—PCT/US2021/039913—ISA/EPO—Dec. 2, 20212.

* cited by examiner

MEASUREMENT REPORTING TIMING ADJUSTMENTS

CROSS REFERENCE

The present application is a 371 national stage filing of International PCT Application No. PCT/US2021/039913 by ZHU et al. entitled "MEASUREMENT REPORTING TIMING ADJUSTMENTS," filed Jun. 30, 2021; and claims priority to International Patent Application No. 202041033119 by ZHU et al. entitled "MEASUREMENT REPORTING TIMING ADJUSTMENTS," filed Aug. 1, 2020, each of which is assigned to the assignee hereof, and each of which is expressly incorporated by reference in its entirety herein.

FIELD OF TECHNOLOGY

The following relates to wireless communications, including measurement reporting timing adjustments.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may operate in a multi-subscriber identification module (MSIM) mode.

SUMMARY

The described techniques relate to improved methods, systems, devices, and apparatuses that support measurement reporting timing adjustments. A base station may configure the UE with a time to trigger (TTT) and a signal quality threshold. If one or more signal quality metrics determined based on one or more signal quality measurements satisfy the signal quality threshold for the duration of the TTT, a measurement report is triggered. However, multi-subscriber identity module (MSIM) may be unable to perform the measurements for the duration of the TTT.

Generally, a user equipment (UE) may determine whether one or more conditions are satisfied, and if so, transmit an early measurement report or ignore a conflicting procedure that renders the measurements unavailable. In some examples, a UE may receive an indication of a minimum TTT in a configuration message with the TTT and the signal quality threshold. The UE may indicate an updated timing, to a base station, based on the minimum TTT. In some examples, the base station may determine that a UE is an MSIM UE, and may configure the duration of the TTT accordingly.

A method of wireless communications at a UE is described. The method may include receiving, from a base station, a measurement configuration including a signal quality threshold, a TTT, and an indication of a minimum TTT having a duration less than a duration of the TTT, where the TTT triggers transmission of a measurement report upon one or more downlink measurements satisfying the signal quality threshold for the duration of the TTT, determining that a combination of a signal quality measurement duration and a downlink measurement unavailability duration exceeds the TTT, transmitting, to the base station, after the minimum TTT threshold expires and before the TTT expires, an indication of an adjusted timing for transmitting the measurement report, and transmitting the measurement report to the base station based on the adjusted timing.

An apparatus for wireless communications at a UE is described. The apparatus may include a processor, memory coupled with the processor, and instructions stored in the memory. The instructions may be executable by the processor to cause the apparatus to receive, from a base station, a measurement configuration including a signal quality threshold, a TTT, and an indication of a minimum TTT having a duration less than a duration of the TTT, where the TTT triggers transmission of a measurement report upon one or more downlink measurements satisfying the signal quality threshold for the duration of the TTT, determine that a combination of a signal quality measurement duration and a downlink measurement unavailability duration exceeds the TTT, transmit, to the base station, after the minimum TTT threshold expires and before the TTT expires, an indication of an adjusted timing for transmitting the measurement report, and transmit the measurement report to the base station based on the adjusted timing.

Another apparatus for wireless communications at a UE is described. The apparatus may include means for receiving, from a base station, a measurement configuration including a signal quality threshold, a TTT, and an indication of a minimum TTT having a duration less than a duration of the TTT, where the TTT triggers transmission of a measurement report upon one or more downlink measurements satisfying the signal quality threshold for the duration of the TTT, determining that a combination of a signal quality measurement duration and a downlink measurement unavailability duration exceeds the TTT, transmitting, to the base station, after the minimum TTT threshold expires and before the TTT expires, an indication of an adjusted timing for transmitting the measurement report, and transmitting the measurement report to the base station based on the adjusted timing.

A non-transitory computer-readable medium storing code for wireless communications at a UE is described. The code may include instructions executable by a processor to receive, from a base station, a measurement configuration including a signal quality threshold, a TTT, and an indication of a minimum TTT having a duration less than a duration of the TTT, where the TTT triggers transmission of a measurement report upon one or more downlink measurements satisfying the signal quality threshold for the duration of the TTT, determine that a combination of a signal quality measurement duration and a downlink measurement unavailability duration exceeds the TTT, transmit, to the base station, after the minimum TTT threshold expires and before the TTT expires, an indication of an adjusted timing for transmitting the measurement report, and transmit the measurement report to the base station based on the adjusted timing.

In some examples of the method, apparatuses, and non-transitory computer-readable medium described herein, transmitting the measurement report to the base station may include operations, features, means, or instructions for including, in the measurement report, an indication of an adjusted TTT based on the adjusted timing.

Some examples of the method, apparatuses, and non-transitory computer-readable medium described herein may further include operations, features, means, or instructions for performing the one or more downlink measurements, and determining, based on performing the one or more downlink measurements, that one or more signal quality metrics satisfy the signal quality threshold for at least the signal quality measurement duration, where transmitting the indication of the adjusted timing for transmitting the measurement report may be based on determining that the one or more signal quality metrics satisfy the signal quality threshold.

In some examples of the method, apparatuses, and non-transitory computer-readable medium described herein, the one or more signal quality metrics include reference signal receive power, reference signal receive quality, or a combination thereof.

In some examples of the method, apparatuses, and non-transitory computer-readable medium described herein, the signal quality measurement duration includes a time duration during which one or more signal metrics satisfy the signal quality threshold.

In some examples of the method, apparatuses, and non-transitory computer-readable medium described herein, the downlink measurement unavailability duration includes a time duration during which the one or more downlink measurements may be unavailable.

In some examples of the method, apparatuses, and non-transitory computer-readable medium described herein, the one or more downlink measurements may be associated with a first subscription.

Some examples of the method, apparatuses, and non-transitory computer-readable medium described herein may further include operations, features, means, or instructions for identifying a high priority procedure to be performed on a second subscription, and tuning, based on the high priority procedure, from a first radio frequency associated with the first subscription to a second radio frequency associated with a second subscription, where the downlink measurement unavailability duration may be based on the tuning.

Some examples of the method, apparatuses, and non-transitory computer-readable medium described herein may further include operations, features, means, or instructions for identifying a resource configuration associated with the TTT, determining that one or more downlink transmission time intervals (TTIs) may be disabled for the resource configuration, and determining, based on the one or more disabled downlink TTIs, the downlink measurement unavailability duration, where determining that the combination of the signal quality measurement duration and the downlink measurement unavailability duration exceeds the TTT may be based on determining the downlink measurement unavailability duration.

Some examples of the method, apparatuses, and non-transitory computer-readable medium described herein may further include operations, features, means, or instructions for identifying a discontinuous reception cycle associated with the TTT, and determining, based on the discontinuous reception cycle, the downlink measurement unavailability duration, where determining that the combination of the signal quality measurement duration and the downlink measurement unavailability duration exceeds the TTT may be based on determining the downlink measurement unavailability duration.

A method of wireless communications at a base station is described. The method may include receiving, from a UE, an indication that the UE is operating in a multi-subscriber identification module mode, adjusting, based on the indication that the UE is operating in the multi-subscriber identification module mode, a configured TTT that triggers transmission of a measurement report upon one or more downlink measurements satisfying the signal quality threshold a duration of the TTT, transmitting, to the UE, an indication of an adjusted TTT based on the adjusting, and receiving, upon expiration of the adjusted TTT, a measurement report from the UE.

An apparatus for wireless communications at a base station is described. The apparatus may include a processor, memory coupled with the processor, and instructions stored in the memory. The instructions may be executable by the processor to cause the apparatus to receive, from a UE, an indication that the UE is operating in a multi-subscriber identification module mode, adjust, based on the indication that the UE is operating in the multi-subscriber identification module mode, a configured TTT that triggers transmission of a measurement report upon one or more downlink measurements satisfying the signal quality threshold a duration of the TTT, transmit, to the UE, an indication of an adjusted TTT based on the adjusting, and receive, upon expiration of the adjusted TTT, a measurement report from the UE.

Another apparatus for wireless communications at a base station is described. The apparatus may include means for receiving, from a UE, an indication that the UE is operating in a multi-subscriber identification module mode, adjusting, based on the indication that the UE is operating in the multi-subscriber identification module mode, a configured TTT that triggers transmission of a measurement report upon one or more downlink measurements satisfying the signal quality threshold a duration of the TTT, transmitting, to the UE, an indication of an adjusted TTT based on the adjusting, and receiving, upon expiration of the adjusted TTT, a measurement report from the UE.

A non-transitory computer-readable medium storing code for wireless communications at a base station is described. The code may include instructions executable by a processor to receive, from a UE, an indication that the UE is operating in a multi-subscriber identification module mode, adjust, based on the indication that the UE is operating in the multi-subscriber identification module mode, a configured TTT that triggers transmission of a measurement report upon one or more downlink measurements satisfying the signal quality threshold a duration of the TTT, transmit, to the UE, an indication of an adjusted TTT based on the adjusting, and receive, upon expiration of the adjusted TTT, a measurement report from the UE.

In some examples of the method, apparatuses, and non-transitory computer-readable medium described herein, receiving the indication that the UE may be operating in a multi-subscriber identification module mode may include operations, features, means, or instructions for receiving uplink signaling including a UE radio capability information element.

In some examples of the method, apparatuses, and non-transitory computer-readable medium described herein, the UE radio capability information element includes an indication of a multi-radio access technology dual connectivity capability.

In some examples of the method, apparatuses, and non-transitory computer-readable medium described herein, the UE radio capability information element includes an indication of a multi-subscriber identification module capability.

In some examples of the method, apparatuses, and non-transitory computer-readable medium described herein, the UE radio capability information element indicates a number of transmitters, a number of receivers, one or more band combinations associated with one or more transmitters, one or more band combinations associated with one or more receivers, or a combination thereof.

In some examples of the method, apparatuses, and non-transitory computer-readable medium described herein, receiving the indication that the UE may be operating in a multi-subscriber identification module mode may include operations, features, means, or instructions for receiving a radio resource control message including UE assistance information, where the radio resource control message may be associated with a first subscription.

In some examples of the method, apparatuses, and non-transitory computer-readable medium described herein, the UE assistance information includes an indication of one or more resources used by the UE, the one or more resources associated with the first subscription and a second subscription.

In some examples of the method, apparatuses, and non-transitory computer-readable medium described herein, the UE assistance information includes an indication of a paging cycle associated with the second subscription.

Some examples of the method, apparatuses, and non-transitory computer-readable medium described herein may further include operations, features, means, or instructions for storing, at the base station, the indication that the UE may be operating in a multi-subscriber identification module mode, performing a handover procedure for the UE from the base station to a second base station, and transmitting, based on the handover procedure, the indication that the UE may be operating in a multi-subscriber identification module mode to the second base station.

DETAILED DESCRIPTION

Figure 1:
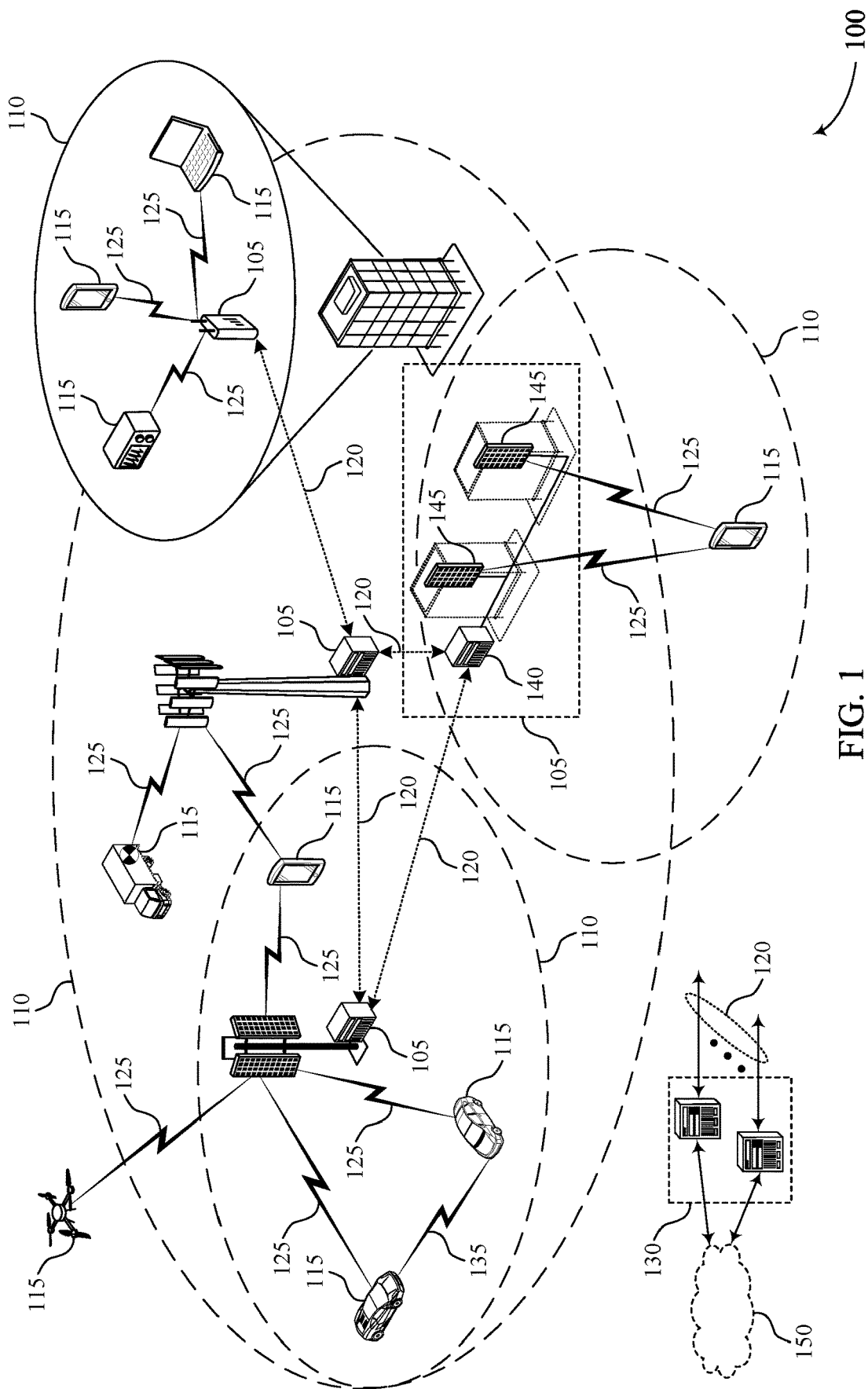
FIG. 1 illustrates an example of a system for wireless communications that supports measurement reporting timing adjustments in accordance with aspects of the present disclosure.

In some examples of a wireless communications system, a user equipment (UE) may support communications with a network using multiple subscriptions associated with multiple subscriber identity modules (SIMs). Such UEs may be referred to as multi-subscriber identity module (MSIM) UEs. In some wireless communications systems, MSIM UEs may initiate one or more connections with the network. For instance, the UE may register with a core network of a 5G system. In some examples, the UE may initiate a communication session (e.g., a packet-switch (PS) session, an IP multimedia subsystem (IMS) voice over PS session, or the like) with a base station. The UE may attempt to perform a first PS registration procedure for a first subscription associated with a first SIM card, and a second PS registration procedure for a second subscription associated with a second SIM card. In some examples, the PS registration procedures may result from a power up procedure, an access and mobility management function (AMF) on/off procedure, or the like.

During the second registration procedure, the UE may successfully register with the network via the second subscription, and may gain access to a data service. As part of the first registration procedure, the network may configure a measurement object (e.g., a 5GNR measurement object via higher layer signaling). The measurement object configuration may include a measurement threshold (e.g., a signal quality or signal strength threshold) and a time to trigger (TTT). The TTT may define an amount of time during one or more measurements (e.g., channel quality measurements, signal quality measurements, etc.) satisfy criteria (e.g., satisfy the signal quality threshold). That is, the UE may perform one or more measurements as instructed via configuration of the measurement object. If the measurements satisfy the signal quality threshold for the duration of TTT, then a measurement report may be triggered. Upon performing the measurements and determining that the signal quality threshold is satisfied for TTT, the UE may transmit a measurement report. The base station may expect a report at a determined time after configuring the measurement object based on the duration of the TTT.

In some example, the UE may be unable to perform the configured measurements for some amount of time, or may be unable to perform the measurements at all for an amount of time sufficient to satisfy the signal quality threshold for the duration of the TTT, or may be unable to transmit the measurement report to the base station at the determined time. For instance, the UE may be configured or instructed to perform another procedure that has a higher priority level than the measurement reporting. In some examples, the base station may instruct the UE to perform a higher priority procedure via higher layer signaling on the first subscription via the first SIM. The higher priority procedure may be, for instance, associated with an IMS registration procedure on the first subscription, and may include a tune away procedure. If the time required for the tune away procedure overlaps with the TTT, or the timing for transmitting the measurement report, or both, then the UE may not be able to determine whether one or more signal quality metrics determined based on the measurements satisfy the threshold (such that a measurement report is not triggered), or may be unable to transmit a triggered measurement report at the determined timing. For instance, if the UE stops performing the measurements before the duration of the TTT, then no measurement report will be triggered. In some examples, the UE may not be able to perform the measurements based on resource configuration (e.g., based on uplink and downlink transmission time intervals (TTI) availability in a time division duplexing (TDD) scenario), discontinuous reception (DRX) cycles on one or more subscriptions, or the like.

For any of these reasons, the UE may be unable to transmit a measurement report to the base station at an expected timing. In such examples, the base station may de-configure the measurement object until the end of a current radio resource control (RRC) connection. The network may reconfigure the NR measurement object or the connection on the second subscription after some amount of time (e.g., several minutes). However, such behavior may result in large delays in the wireless communications system (e.g., a 5G system). Such delays may result in increased system congestion, increased latency, decreased throughput at the MSIM UE, and decreased user experience.

In some examples, to avoid such delays, an MSIM UE may adjust a TTT. For instance, a UE may determine whether one or more conditions are satisfied, and may transmit an early measurement report if the conditions are satisfied. In such examples, a UE may determine that it is operating in a connected mode on one subscription, and that the signal quality threshold has been configured with an NR measurement object. The UE may begin to perform one or more measurements, and may determine that one or more resulting signal quality metrics satisfy the signal quality threshold. If the TTT is large enough (e.g., satisfies a threshold or is larger than a determined time period) to perform a tune away procedure for another subscription, and tune back to the first subscription in time, then the UE may permit the tune away procedure, and may transmit the measurement report at the expiration of the TTT. If, however, the TT is not large enough for such a procedure, then the UE may determine if there is enough time to perform early reporting on the current subscription. If there is enough time to perform early reporting on the current subscription (e.g., before the tune away procedure), then the UE may decrease the duration of the TTT and trigger an early measurement report. If, however, there is not sufficient time to perform early reporting on the current subscription (e.g., before the tune away procedure), then the UE may ignore or drop the tune away procedure and instead prioritize the measurement report after the configured TTT duration.

In some examples, the UE may receive an indication from the base station of a minimum TTT, and may adjust its TTT for early or late reporting based thereon. For instance, the base station may indicate a TTT, a minimum TTT, and the signal quality threshold in one or more configuration messages. The UE may determine a downlink measurement unavailability duration during which downlink measurements will be unavailable, and may determine that the downlink measurement unavailability duration and a downlink measurement duration during which signal quality metrics determined from the measurements satisfy the signal quality threshold exceed the configured TTT. In such cases, the UE may transmit an indication (e.g., at a time that is less than the TTT) to the base station indicated a later timing (e.g., a timing that is greater than the TTT) at which it will transmit a measurement report. After the downlink unavailability duration, the UE may perform any remaining downlink measurements, and may transmit a measurement report, according to the indicated timing.

In some examples, the base station may determine that the UE is an MSIM UE, and may adjust the TTT accordingly. For instance, the UE may transmit UE capability information, UE assistance information, or the like, to the base station. The base station may adjust (e.g., decrease) the duration of the TTT based on determining from the UE capability information or the UE assistance information that the UE is an MSIM UE. The base station may configure the UE with the adjusted TTT, and the UE may transmit a measurement report at a timing based on the adjusted TTT.

Particular aspects of the subject matter described herein may be implemented to realize one or more advantages. The described techniques may support improvements in system efficiency such that a wireless device may avoid MSIM performance degradation, decrease system delays and system latency, increase throughput, and improve system efficiency. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to flow diagrams and process flows. Aspects of the disclosure are further illustrated by and described with reference to apparatus diagrams, system diagrams, and flowcharts that relate to measurement reporting timing adjustments.

FIG. 1 illustrates an example of a wireless communications system 100 that supports measurement reporting timing adjustments in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may configure a UE 115 with a TTT and a signal quality threshold. The UE 115 may determine whether one or more conditions are satisfied, and if so, transmit an early measurement report or ignore a conflicting procedure that renders the measurements unavailable. In some examples, a UE 115 may receive, from a base station 105, an indication of a minimum TTT in a configuration message with the TTT and the signal quality threshold. The UE 115 may indicate an updated timing, to a base station 105, based on the minimum TTT. In some examples, the base station 105 may determine that a UE 115 is an MSIM UE 115, and may configure the duration of the TTT accordingly.

Figure 2:
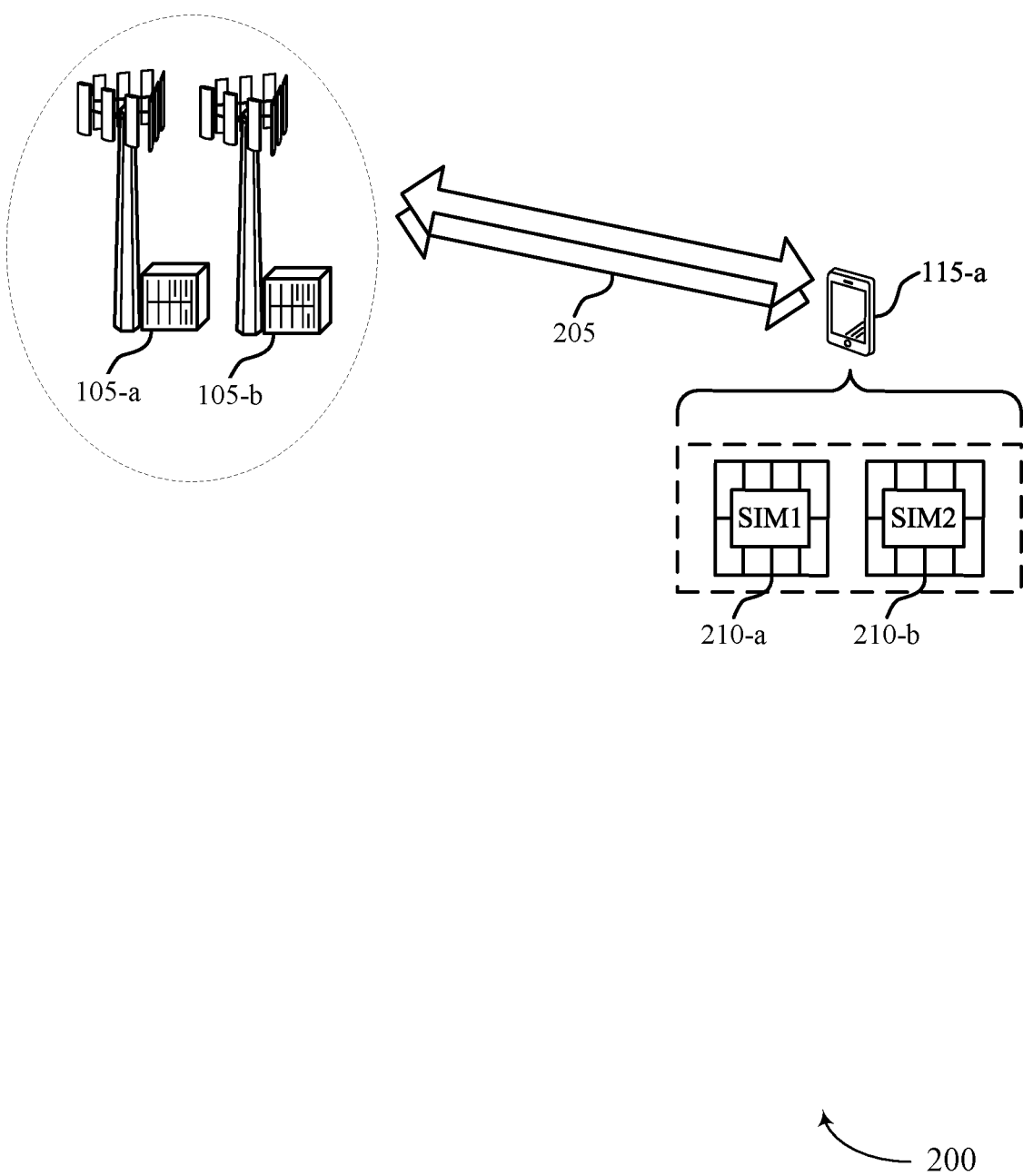
FIG. 2 illustrates an example of a wireless communications system that supports measurement reporting timing adjustments in accordance with aspects of the present disclosure.

FIG. 2 illustrates an example of a wireless communications system 200 that supports measurement reporting timing adjustments in accordance with aspects of the present disclosure. In some examples, wireless communications system 200 may implement aspects of wireless communications system 100. Wireless communications system 200 includes base station 105-a, base station 105-b, and UE 115-a, which may be examples of a base station 105 and a UE 115 described with reference to FIG. 1. Base station 105-a and base station 105-b may communicate with UE 115-a on carriers 205. Similar to wireless communications system 100, wireless communications system 200 may be a packet-based network that operates according to a layered protocol stack.

UE 115-a may be an example of an MSIM UE and may include a first SIM 210-a and a second SIM 210-b. The first SIM 210-a may be associated with a first subscription (e.g., with a first operator) and the second SIM 210-b may be associated with a second subscription (e.g., with the first operator or a second operator that is different from the first operator). In some cases, UE 115-a may communicate with base station 105-a according to the first subscription associated with SIM 210-a, and may communicate with base station 105-b according to the second subscription associated with SIM 210-b. In some cases, UE 115-a may communicate with the same base station 105 according to the first subscription associated with SIM 210-a and the second subscription associated with SIM 210-b.

In some examples, UE 115-a may include a single radio for communications with base station 105-a and 105-b. In some examples, the radio may include one or more RF chains, but may support communication with only one of base station 105-a or base station 105-b at a time (e.g., may not have separately tunable RF chains capable of concurrent communication with base stations 105-a and 105-b or on the first subscription and second subscription, or both). In some examples, if a higher priority task or communication event is configured or scheduled on the first subscription, the UE 115-a may tune away from communications with base station 105-a according to the first subscription if a communication event occurs between base station 105-b and UE 115-a according to the second subscription. For example, UE 115-a may be communicating in a connected mode with base station 105-a according to the first subscription while in an idle mode for the second subscription (e.g., the network may consider UE 115-a associated with the second subscription to be in an idle mode). However, paging occasions may be defined for the second subscription so that the UE 115-*a* can be contacted if the network associated with the first subscription has data for the UE 115-*a*. In addition, the UE 115-*a* may perform other idle-mode procedures to maintain the ability to be contacted by the network associated with the second subscription or may receive other communications. For example, communications according to the second subscription may include receiving a paging message according to the second subscription, performing a voice call according to the second subscription, performing a tracking area update according to the second subscription, transmitting or receiving a short message service (SMS) or multimedia messaging service (MMS) according to the second subscription, non-access stratum (NAS) signaling according to the second subscription, packet-switched signaling according to the second subscription, etc.

In some examples, UE 115-*a* may attempt to establish a connection with a base station 105 via multiple subscriptions (e.g., the first subscription and the second subscription). For instance, during an MSIM power up scenario, or after an APM ON/OFF procedure, or the like, UE 115-*a* may attempt to perform registration procedures on both the first subscription and the second subscription. In some examples, the first subscription may be an LTE subscription, and the second subscription may be an LTE subscription or an NR subscription, or an LTE subscription with NR capabilities, or the like. UE 115-*a* may initiate a PS registration procedure on the second subscription and achieve data service from base station 105-*a* via the second subscription. UE 115-*a* may also initiate a PS registration procedure on the first subscription. In some examples (e.g., as part of the PS registration procedure or based thereon), the network (e.g., via higher layer signaling such as an RRC message) may configure UE 115-*a* with a measurement object (e.g., a 5GNR measurement object). The base station 105 may transmit one or more configuration messages (e.g., an RRCConnectionReconfiguration message) which may indicate, to UE 115-*a*, a signal quality threshold and a TTT. The signal quality threshold (which may be referred to as a b1 threshold) may provide a threshold value of signal quality, signal strength, received power, measured power, detected interference, or the like, associated with one or more measurements (e.g., reference signal receive power (RSRP), reference signal receive quality (RSRQ), or the like). The TTT may indicate a time duration after which, if one or more criteria are satisfied, a measurement report is triggered. Thus, UE 115-*a* may receive the configuration message, and may perform one or more signal quality measurements. If signal quality metrics determined from the signal quality measurements satisfy the signal quality threshold for the duration of the TTT, then UE 115-*a* may transmit a measurement report to the base station 105 at a timing that is based on the duration of the TTT (e.g., immediately or within a threshold time duration after expiration of the TTT, at a first uplink reporting resource available after expiration of the TTT, or the like). The base station 105 may thus monitor for and receive the measurement report at a timing that is based on the duration of the TTT and the configuration of the measurement object.

In some examples, UE 115-*a* may suspend the one or more measurements, or the measurement report, or both, in which case the base station may fail to receive the measurement report. For instance, UE 115-*a* may receive, via the base station 105 or another base station 105 on the first subscription, instructions to perform a higher priority procedure that interferes with the one or more measurements or transmission of the measurement report or both. For instance, the base station 105 may configure an IMS registration procedure on the first subscription. UE 115-*a* may tune away from communications on the second subscription to perform the IMS registration procedure on the first subscription. In such examples, UE 115-*a* may suspend the measurements or the measurement report or both to perform the tune away procedure. For instance, if UE 115-*a* performs the tune away procedure prior to the expiration of the TTT, then the UE may not be able to determine that signal quality metrics associated with the measurements satisfy the signal quality threshold for the duration of the TTT, and may therefore fail to trigger the measurement report. As a result, UE 115-*a* may fail to transmit a measurement report, and the base station 105 may not add UE 115-*a* to the network or a secondary cell group (SCG), etc.

The base station 105 may monitor for a particular amount of time based on the TTT duration (e.g., a number of seconds). If the base station 105 fails to receive the measurement report from UE 115-*a*, then the base station 105 may de-configure the measurement object until the end of a current RRC connection before reconfiguring it. In such examples, UE 115-*a* may be unable to reestablish a connection with the network for an extended period of time (e.g., a number of minutes). Such delays may hamper MSIM performance at UE 115-*a*. For instance, UE 115-*a* MSIM performance may be degraded when UE 115-*a* communicates via the first subscription in a connected mode, and triggers a tune away on the second subscription due to page decode reasons or any other higher priority tasks that result in a tune away procedure.

In some examples, UE 115-*a* may perform one or more techniques described herein to avoid such delays and performance degradation. For instance, UE 115-*a* may determine whether one or more conditions are satisfied, and if so, may transmit an early measurement report or ignore the tune away procedure, as described in greater detail with reference to FIG. 3. In some examples, UE 115-*a* may receive an indication of a minimum TTT with the TTT and the signal quality threshold. UE 115-*a* may indicate an updated timing, to the base station, based on the minimum TTT as described in greater detail with reference to FIG. 4. In some examples, the base station 105 may determine that UE 115-*a* is an MSIM UE, and may configure the duration of the TTT accordingly to avoid such delays, as described in greater detail with reference to FIG. 5.

Figure 3:
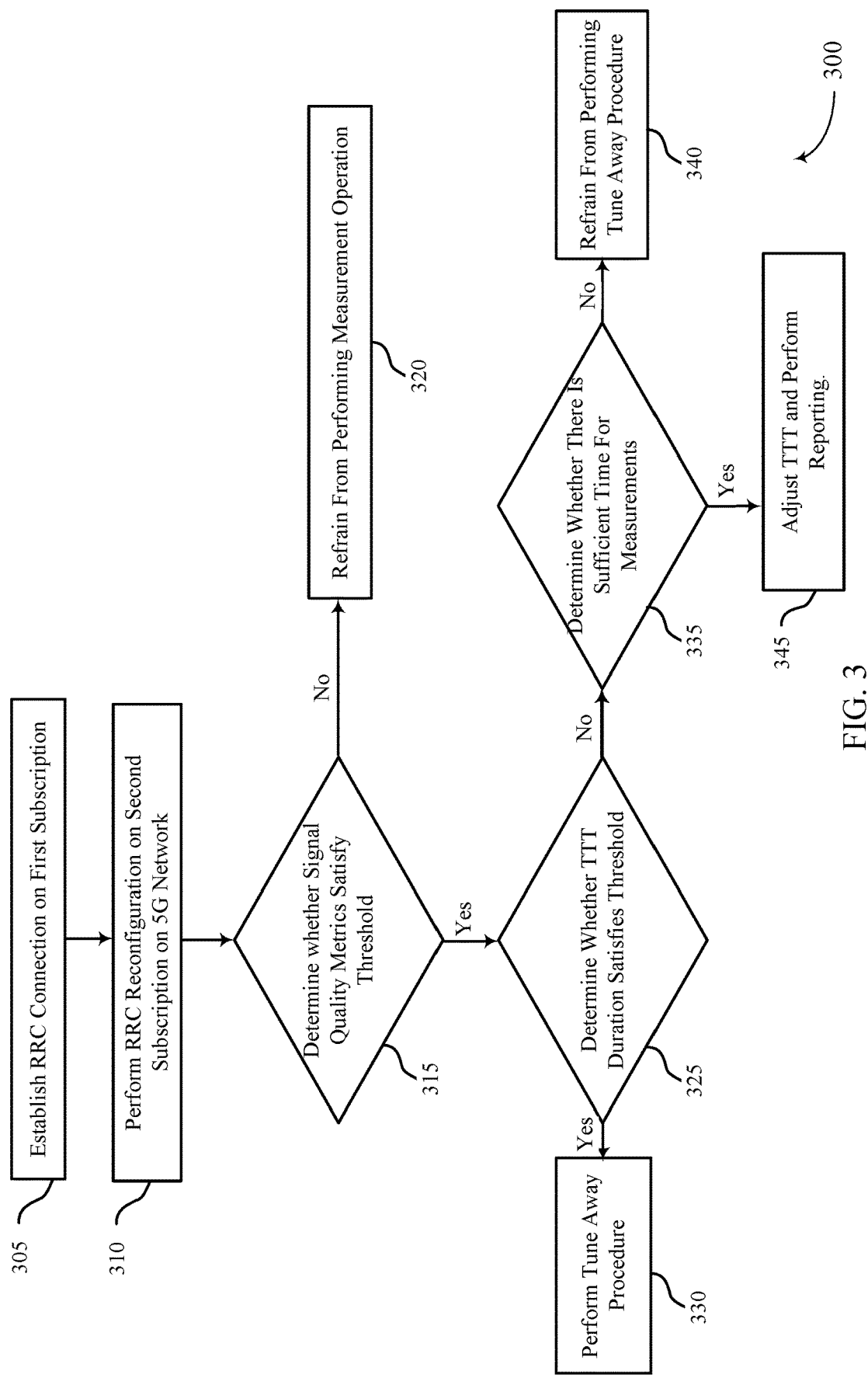
FIG. 3 illustrates an example of a flow diagram that supports measurement reporting timing adjustments in accordance with aspects of the present disclosure.

FIG. 3 illustrates an example of a process diagram 300 that supports measurement reporting timing adjustments in accordance with aspects of the present disclosure. In some examples, process diagram 300 may implement aspects of wireless communications system 100 and wireless communications system 200. For instance, a UE 115 and a base station 105, which may be examples of corresponding devices as described with reference to FIGS. 1 and 2, may implement aspects of process diagram 300.

At 305, UE 115 may establish a connection (e.g., an RRC connection) on a first subscription on a wireless communications network (e.g., a 5G network). Thus, UE 115 may operate in a connected mode via the first subscription.

At 310, UE 115 may perform an RRC reconfiguration procedure on a second subscription on a wireless communications network (e.g., a 5G network). UE 115 may operate in a connected mode based on a configured NR measurement object after a 5G NR cell is detected.

At 315, UE 115 may determine whether one or more signal quality metrics satisfy a signal quality threshold (which may be referred to as a b1 threshold). For instance, UE 115 may perform one or more RSRP or RSRQ measurements, or the like. UE 115 may determine that, for a downlink measurement time duration (e.g., less than or equal to the TTT), one or more L2NR cell quality metrics (e.g., RSRP) is well within the signal quality threshold (e.g., a b1 threshold). If the one or more signal quality metrics determined by the measurements satisfy the signal quality threshold, then UE 115 may continue with the measurement and evaluation procedure in accordance with the configured NR measurement object.

At 320, if the one or more signal quality metrics do not satisfy the signal quality threshold, then UE 115 may refrain from performing a measurement operation.

At 325, if the one or more signal quality metrics do satisfy the signal quality threshold, then UE 115 may determine whether the TTT duration satisfies a threshold time duration.

At 330, if UE 115 determines that the TTT is large enough to tune away to the first subscription and re-tune to the second subscription within the duration of the TTT, then UE 115 may perform the tune away procedure. For instance, UE 115 may perform the tune away procedure and perform an IMS registration procedure. After the tune away procedure, UE 115 may tune back to the second subscription and (within the TTT) transmit the measurement report upon expiration of the TTT (where one or more signal quality metrics satisfy the signal quality threshold for the duration of the TTT) using the second subscription. That is, UE 115 may permit the tune away procedure only if the TTT is large enough to allow retuning to the second subscription after performing the tune away procedure within the duration of the TTT.

At 335, if UE 115 determines that the TTT is not large enough to tune away to the first subscription and re-tune to the second subscription within the duration of the TTT, then UE 115 may determine whether there is sufficient time to prepare and send the measurement report (e.g., before the tune away procedure) on the second subscription.

At 345, if there is sufficient time to prepare and transmit the measurement report, UE 115 may adjust the TTT (e.g., decrease the TTT), and transmit a measurement report to the base station 105 (e.g., perform early reporting). That is, UE 115 may decrease the duration of the TTT and trigger a measurement report upon expiration of the decreased TTT (prior to the tune away procedure). Having already performed the early measurement reporting, UE 115 may then perform the tune away procedure. That is, UE 115 may perform L2NR early reporting (e.g., immediately upon determining that there is sufficient time to prepare and transmit the measurement report within the duration of the TTT) by scaling down the TTT. The UE 115 may determine to scale down the TTT or scale down a UE back off interval based at least in part on a DRX cycle for the second subscription, or the first subscription, or both, to ensure that there is sufficient time to report the L2NR measurement on the second subscription (e.g., after performing the tune away procedure and retuning to the second subscription).

At 340, if there is not sufficient time to prepare and transmit the measurement report prior to the tune away procedure, then UE 115 may refrain from performing the tune away procedure to the first subscription, and may instead ignore the tune away procedure. For instance, UE 115 may ignore the tune away procedure or other configured tasks on the first subscription, and may instead remain on the second subscription. UE 115 may perform the one or more measurements (e.g., the signal quality measurements) for the duration of the TTT on the second subscription, and may prioritize the measurement report (e.g., L2NR measurements and measurement reporting) over any other tasks (e.g., on other subscriptions).

In some examples, UE 115 may adjust the TTT or a timing for transmitting a measurement report or both based on a configured minimum TTT, as described in greater detail with reference to FIG. 4.

Figure 4:
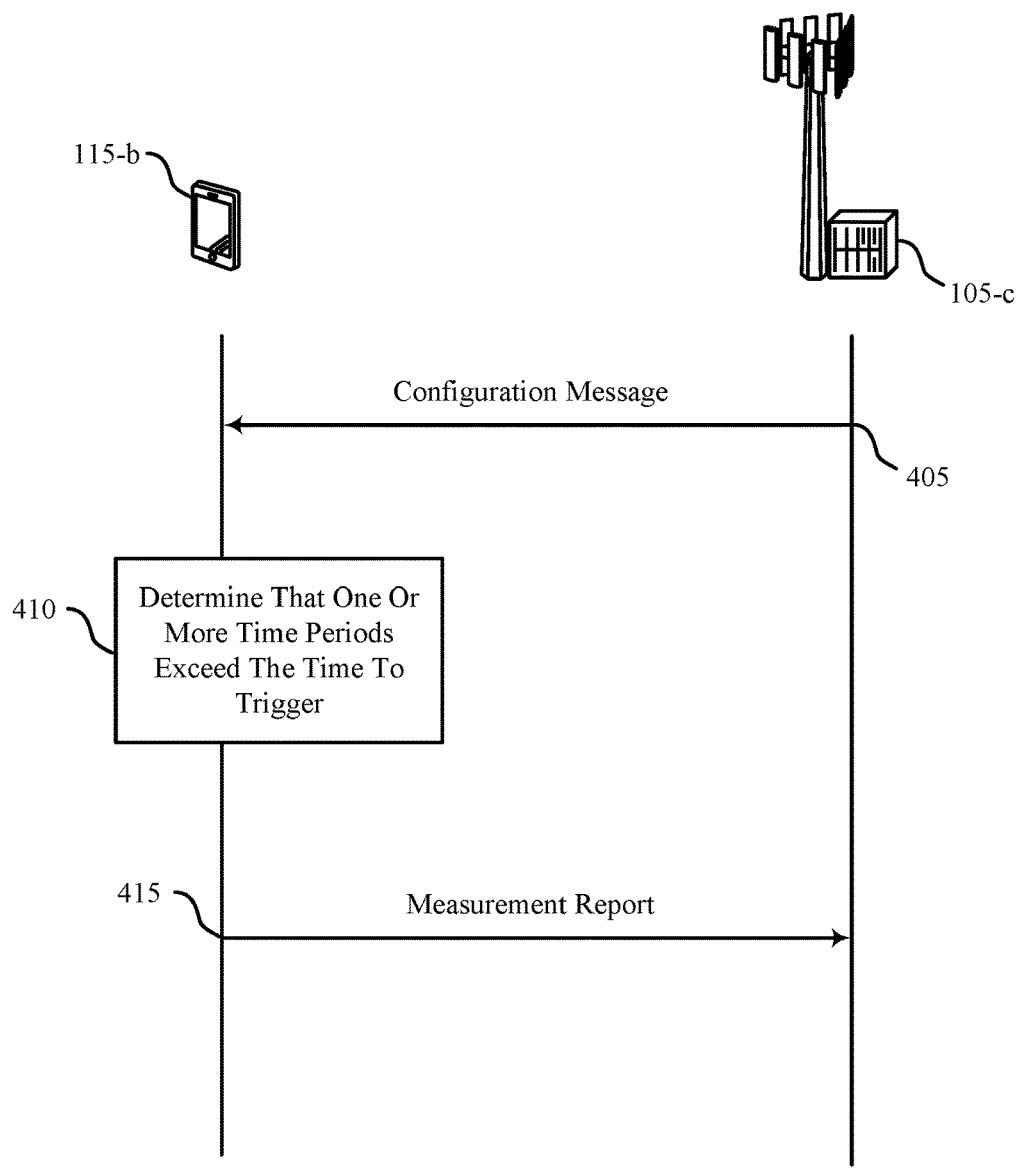
FIG. 4 illustrates an example of a process flow that supports measurement reporting timing adjustments in accordance with aspects of the present disclosure.

FIG. 4 illustrates an example of a process flow 400 that supports measurement reporting timing adjustments in accordance with aspects of the present disclosure. In some examples, process flow 400 may implement aspects of wireless communications system 100 and wireless communications system 200. For instance, a UE 115 and a base station 105, which may be examples of corresponding devices as described with reference to FIGS. 1 and 2, may implement aspects of process flow 400.

At 405, base station 105-*c* may transmit, and UE 115-*b* may receive, a configuration message. The configuration message may include an indication of a signal quality threshold (which may be referred to as a b1 threshold), an indication of a minimum TTT (which may be referred to as TTT_Low), and an indication of a TTT. The TTT may trigger a transmission of a measurement report when one or more downlink measurements (e.g., RSRP, RSRQ, or the like) satisfy the signal quality threshold for the duration of the TTT. The minimum TTT may be a minimum requirement for TTT, and may be configured by the network (e.g., in the configuration message, which may an RRCConnectionReconfiguration message) as part of a measurement configuration.

At 410, UE 115-*b* may determine that one or more time periods exceed the TTT. For instance, UE 115-*b* may identify a signal quality measurement duration (e.g., a time duration during which UE 115-*b* performs one or more measurements and one or more signal metrics such as RSRP or RSRQ satisfy the signal quality threshold). The signal quality measurement duration may be referred to as T_Reach.

UE 115-*b* may also identify a downlink measurement unavailability duration (e.g., a time duration during which the one or more downlink measurements are unavailable) (which may be referred to as T_TA). For instance, UE 115-*b* may identify a resource configuration (e.g., a TDD resource configuration) associated with the time to trigger. The TDD resource configuration may include an uplink downlink TTI may disable downlink signaling for the downlink measurement unavailability duration. In some cases, the downlink measurement unavailability duration may be based on a high priority task being scheduled on another subscription. For instance, base station 105-*c* may configure (e.g., via RRC signaling) a higher priority task that requires a tune away procedure from the current subscription to another subscription for the downlink measurement unavailability duration. In some cases, the downlink measurement unavailability duration may be based on a timing restriction or operational mode timing, such as a DRX cycle for the current subscription, or another subscription, or both.

In some examples, UE 115-*b* may determine that the combination of the signal quality measurement duration and the downlink measurement unavailability time duration (e.g., T_Reach and T_TA) exceed the TTT indicated in the configuration message at 405. In such cases, UE 115-*b* may determine that, as a result of the timing of the downlink measurement unavailability time, UE 115-*b* may not be able to trigger a measurement report (e.g., determine that the one or more signal quality measurements satisfy the signal quality threshold for the full duration of the TTT) or transmit a measurement report upon expiration of the TTT.

At 415, UE 115-*b* may transmit a measurement report. The measurement report may be triggered based on determining that the one or more signal quality metrics satisfy the signal quality threshold for at least the duration of the minimum TTT. In some examples, UE 115-*b* may loosen or adjust the TTT based on the minimum TTT. For instance, UE 115-*b* may change (e.g., decrease) the TTT and perform early measurement reporting if the combination of the signal quality measurement duration and the downlink measurement unavailability time duration exceed the TTT, but the signal quality measurement duration exceeds the minimum TTT. In some examples, the updated timing of the measurement report may be based on identifying the TDD configuration, or a subsequent on period in a DRX cycle, or a timing before or after a tune away procedure, or the like In some examples, the measurement may include an indication of an adjusted timing. For instance, UE 115-*b* may transmit an RRC message including the measurement report and an information element (IE) indicating an actual or updated TTT. In some examples, the updated TTT may be equal to the signal quality measurement duration (e.g., a time period, the minimum TTT plus an offset, the configured TTT minus an offset or plus an offset, or the like). In some cases, base station 105-*c* may utilize the updated TTT for subsequent procedures (e.g., may configure UE 115-*b* or other UEs 115 with a TTT that is based on or equal to the updated TTT).

At 420, UE 115-*b* may transmit a measurement report. In some examples, based on the downlink measurement unavailability time duration, UE 115-*b* may extend the TTT or may initiate the TTT or the one or more measurements at a later time, resulting in a delayed measurement report at 420. In such examples, UE 115-*b* may indicate, at 415, a delay, a time offset, or a later time at which it will transmit the measurement report. In such cases, at 420, UE 115-*b* may transmit the measurement report at the later indicated time. In some examples, the delayed measurement reporting or the updated timing of the measurement report may be based on identifying the TDD configuration, or a subsequent on period in a DRX cycle, or a timing before or after a tune away procedure, or the like.

Figure 5:
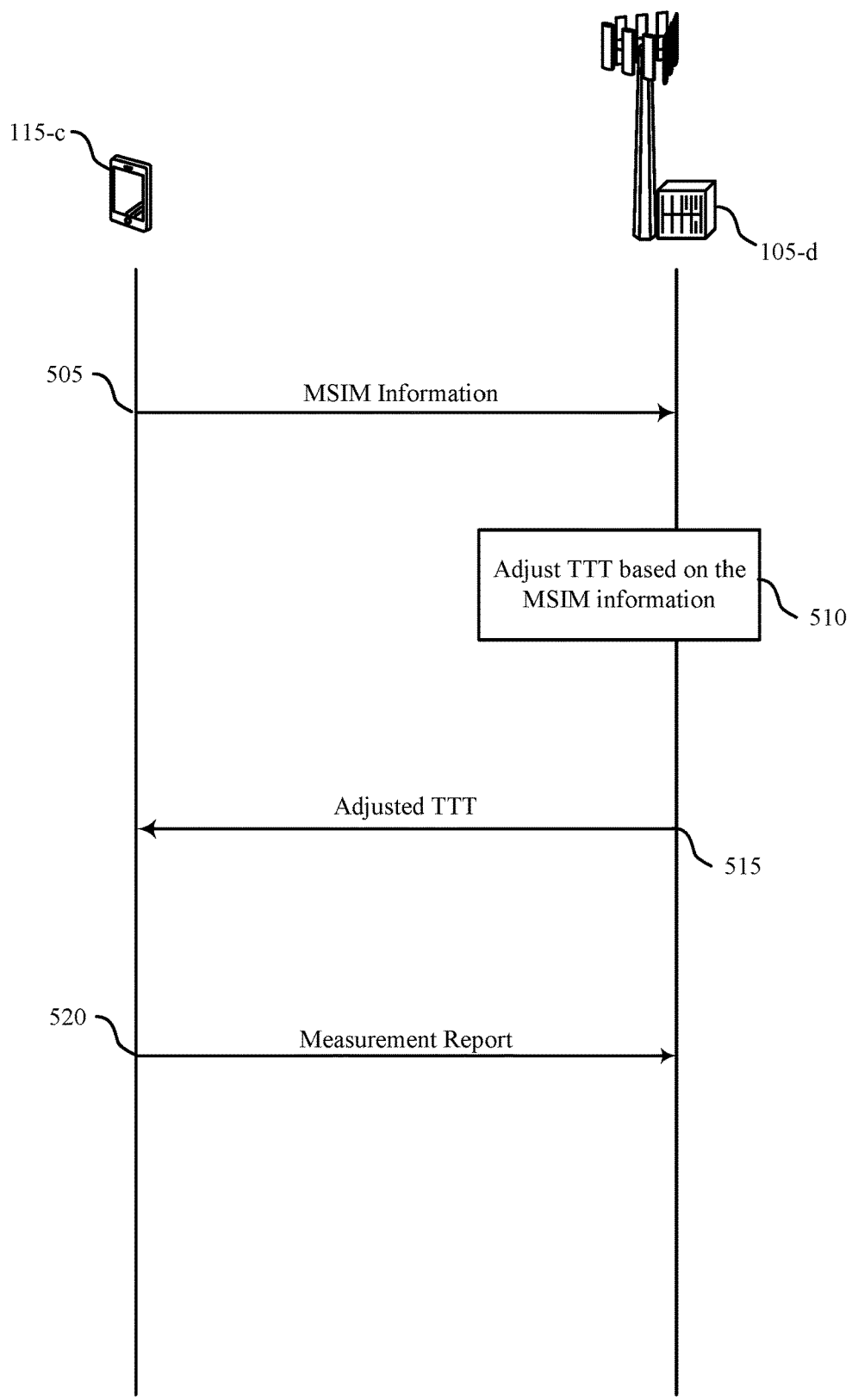
FIG. 5 illustrates an example of a process flow that supports measurement reporting timing adjustments in accordance with aspects of the present disclosure.

FIG. 5 illustrates an example of a process flow 500 that supports measurement reporting timing adjustments in accordance with aspects of the present disclosure. In some examples, process flow 500 may implement aspects of wireless communications system 100 and wireless communications system 200. For instance, a UE 115 and a base station 105, which may be examples of corresponding devices as described with reference to FIGS. 1 and 2, may implement aspects of process flow 500.

At 505, UE 115-*c* may transmit, to base station 105-*d*, MSIM information. The MSIM information may include an indication that UE 115-*c* is operating in an MSIM mode.

In some examples, the MSIM information may include a UE capability information (e.g., a UE radio capability information element (IE) in an RRC message). The UE capability information may include an indication of multi radio access technology (RAT) dual connectivity (MR-DC) capability, MSIM capability, or the like. In some examples, the UE capability information may include an indication of a number of transmitters or a number of receivers, or both. The number of transmitters or number of receivers may include a number of transmit or receive antennas, a number of transmit or receive chains, a number of software or hardware components or subcomponents, one or more portions of a modem, or the like. The UE capability information may include one or multiple subscription, on one or multiple SIMS. In some examples, the UE capability information may include an indication of a number of transmitters or receivers sharing different bands, bandwidth parts, band combinations, or the like. The number of transmitters or number of receivers may include a number of transmit or receive antennas, a number of transmit or receive chains, a number of software or hardware components or subcomponents, one or more portions of a modem, or the like.

In some examples, the MSIM information may include UE assistance information. The UE assistance information may be received, for example, via RRC signaling. The UE assistance information may include an indication that a UE is sharing radio frequency (e.g., for both transmitters and receivers, or for transmitters only, or for receivers only) with another SIM or another subscription. In some examples, the UE assistance information may include a paging cycle for another SIM or another subscription.

The MSIM information may include only the UE assistance information, only the UE capability information, or both. The UE assistance information and UE capability information may be transmitted in separate messages or together in a single message (e.g., one or more IEs of an RRC message).

At 510, base station 105-*d* may adjust a TTT based on the MSIM information. For instance, base station 105-*d* may have a baseline TTT for triggering standard or non-MSIM UEs. Upon receiving the MSIM information from UE 115-*c* and determining that UE 115-*c* is an MSIM UE, base station 105-*d* may adjust the TTT. For instance, base station 105-*d* may decrease the duration of the TTT allowing for earlier reporting by UE 115-*c* to avoid failed reporting due to tune away procedures, TDD configurations, DRX cycles, or the like. Base station 105-*d* may utilize a fixed adjusted TTT for all MSIM UEs 115, or may adjust the TTT on a per-node basis.

At 515, base station 105-*d* may transmit an indication of the adjusted TTT. For example, base station 105-*d* may transmit a configuration message (e.g., an RRC configuration message) indicating the adjusted TTT (which may be a shortened TTT) and the signal quality threshold.

At 520, UE 115-*c* may transmit a measurement report according to the adjusted TTT. That is, UE 115-*c* may determine that one or more measurements (e.g., RSRP, RSRQ, or the like) satisfy a signal quality threshold for the duration of the adjusted TTT (e.g., instead of a previously configured or non-MSIM UE TTT), and may transmit the measurement report upon expiration of the adjusted TTT. Base station 105-*d* may monitor for and receive the measurement report at a timing that is based on the adjusted TTT.

In some examples, base station 105-*d* may store the MSIM information received at 505, the adjusted TTT for UE 115-*c*, or both. For instance, base station 105-*d* may store UE capability information, UE assistance information, or both. If base station 105-*d* performs a handover procedure, a DC establishment or modification procedure, or the like, then base station 105-*d* may transfer the stored UE capability information or the UE assistance information, or both for UE 115-*c* to another base station 105 as part of the procedure. The transfer of the stored MSIM information may be performed via wired or wireless backhaul signaling, forwarded via one or more additional device, or the like.

Figure 6:
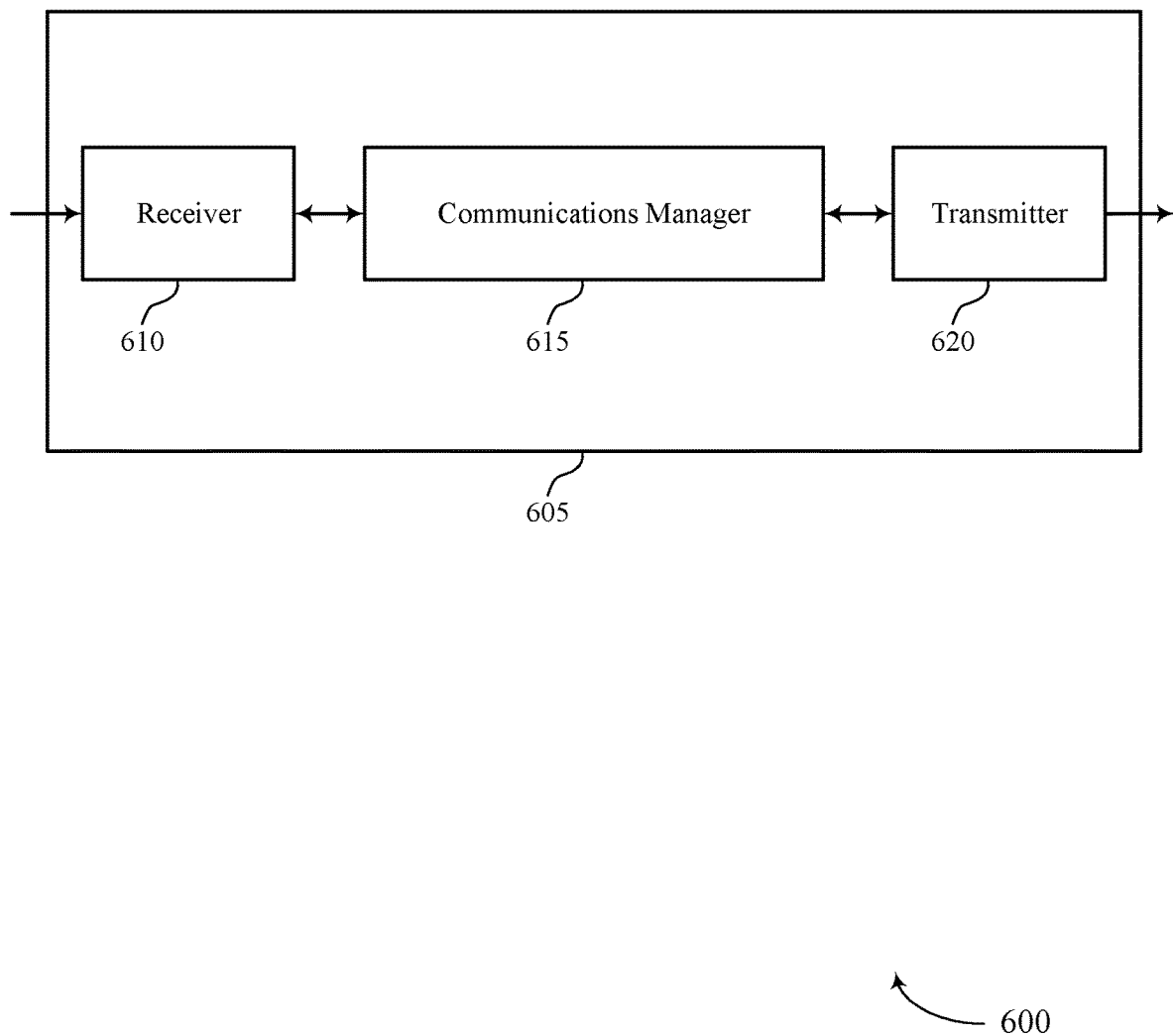
FIGS. 6 and 7 show block diagrams of devices that support measurement reporting timing adjustments in accordance with aspects of the present disclosure.

FIG. 6 shows a block diagram 600 of a device 605 that supports measurement reporting timing adjustments in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to measurement reporting timing adjustments, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger, determine that a combination of a signal quality measurement duration and a downlink measurement unavailability duration exceeds the time to trigger, transmit, to the base station, after the minimum time to trigger threshold expires and before the time to trigger expires, an indication of an adjusted timing for transmitting the measurement report, and transmit the measurement report to the base station based on the adjusted timing. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device to avoid MSIM performance degradation, avoid system delays and latency, increase throughput, and improve user experience.

Figure 9:
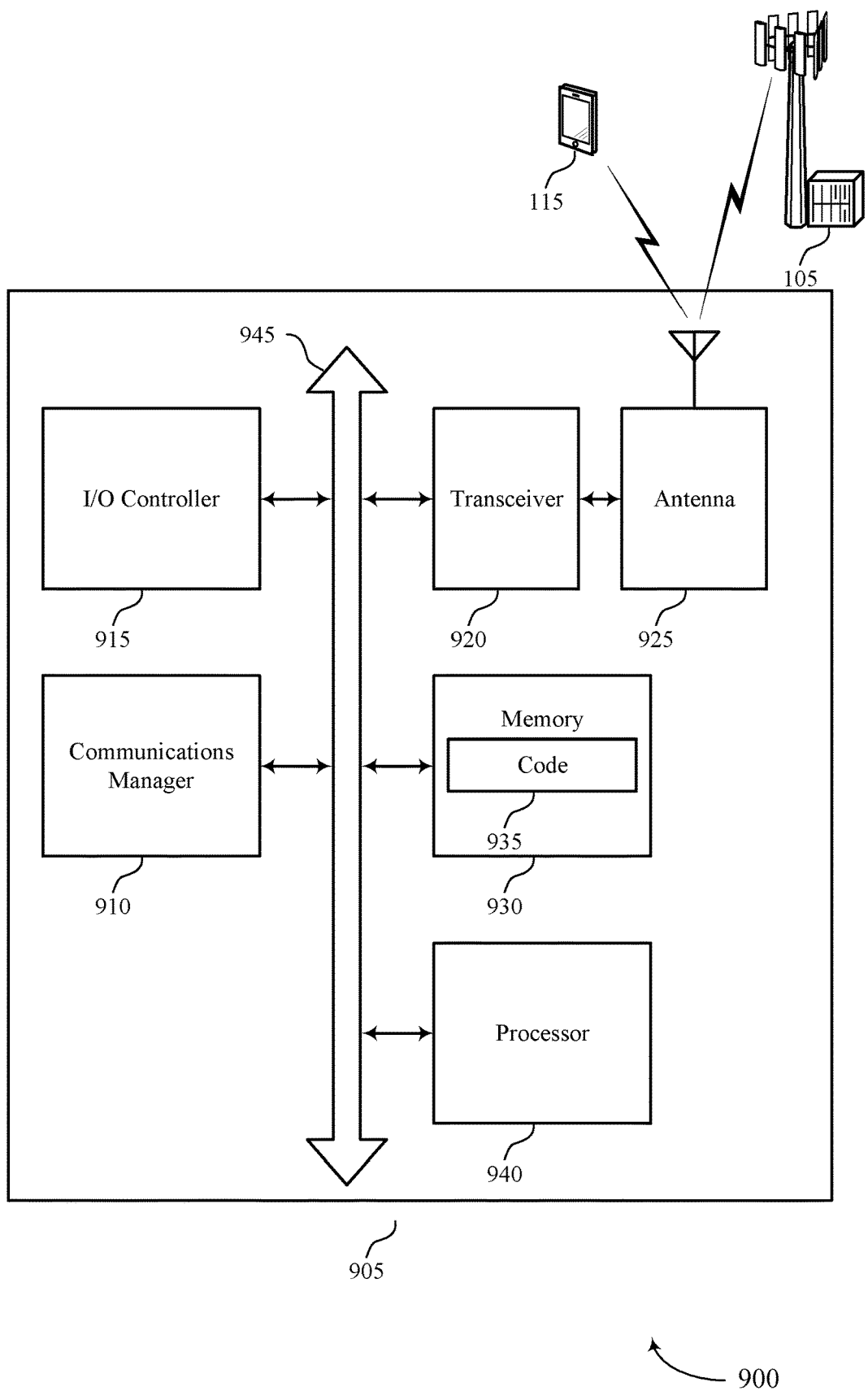
FIG. 9 shows a diagram of a system including a device that supports measurement reporting timing adjustments in accordance with aspects of the present disclosure.

Based on techniques for efficiently communicating maximum number of layers for a device as described herein, a processor of a UE 115 (e.g., controlling the receiver 610, the transmitter 620, or a transceiver 920 as described with respect to FIG. 9) may increase system efficiency and decrease unnecessary processing at a device.

Figure 7:
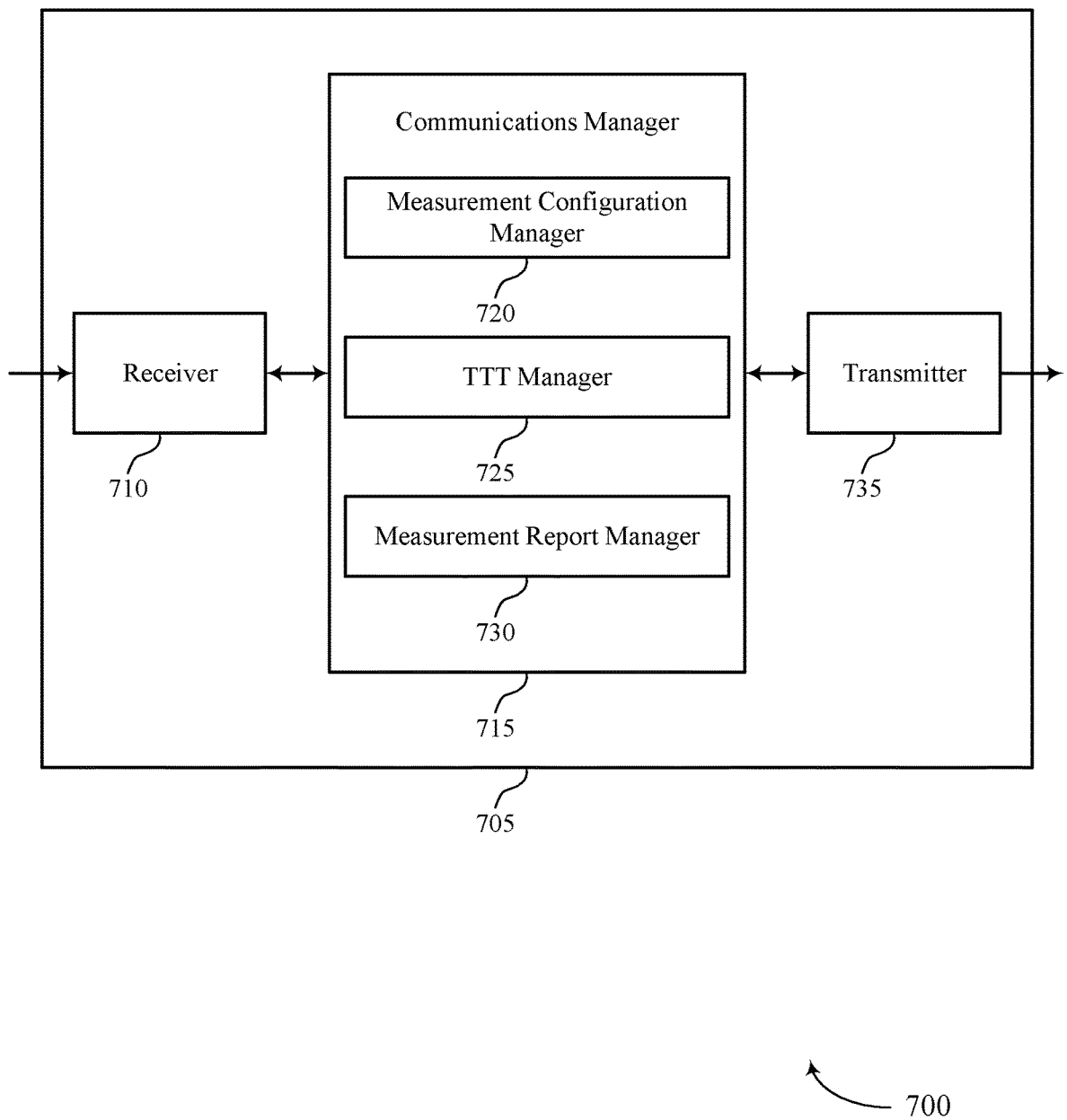

FIG. 7 shows a block diagram 700 of a device 705 that supports measurement reporting timing adjustments in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to measurement reporting timing adjustments, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a measurement configuration manager 720, a TTT manager 725, and a measurement report manager 730. The communications manager 715 may be an example of aspects of the communications manager 910 described herein.

The measurement configuration manager 720 may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger.

The TTT manager 725 may determine that a combination of a signal quality measurement duration and a downlink measurement unavailability duration exceeds the time to trigger.

The measurement report manager 730 may transmit, to the base station, after the minimum time to trigger threshold expires and before the time to trigger expires, an indication of an adjusted timing for transmitting the measurement report and transmit the measurement report to the base station based on the adjusted timing.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
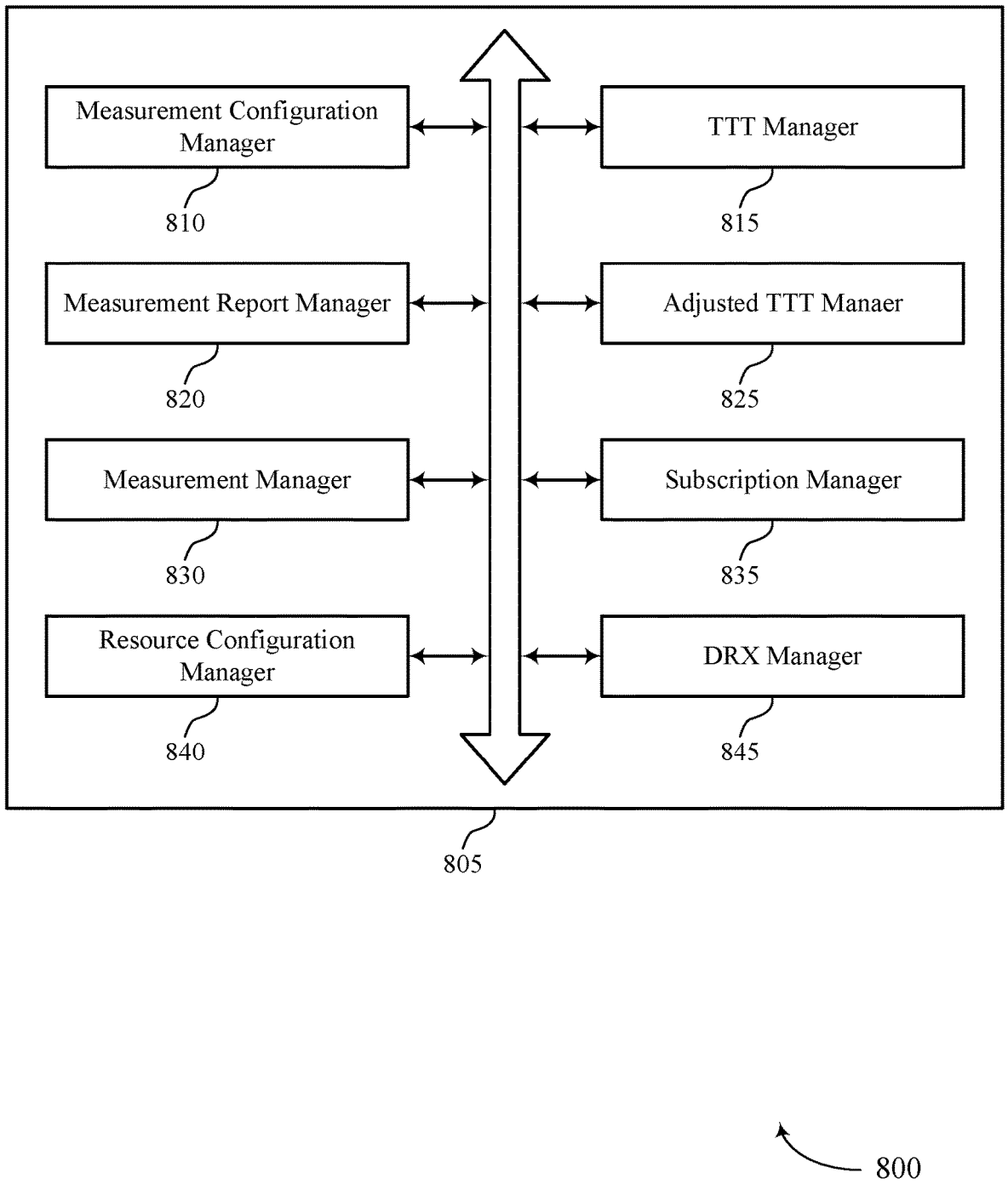
FIG. 8 shows a block diagram of a communications manager that supports measurement reporting timing adjustments in accordance with aspects of the present disclosure.

FIG. 8 shows a block diagram 800 of a communications manager 805 that supports measurement reporting timing adjustments in accordance with aspects of the present disclosure. The communications manager 805 may be an example of aspects of a communications manager 615, a communications manager 715, or a communications manager 910 described herein. The communications manager 805 may include a measurement configuration manager 810, a TTT manager 815, a measurement report manager 820, an adjusted TTT manager 825, a measurement manager 830, a subscription manager 835, a resource configuration manager 840, and a DRX manager 845. Each of these modules may communicate, directly or indirectly, with one another (e.g., via one or more buses).

The measurement configuration manager 810 may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger.

The TTT manager 815 may determine that a combination of a signal quality measurement duration and a downlink measurement unavailability duration exceeds the time to trigger.

The measurement report manager 820 may transmit, to the base station, after the minimum time to trigger threshold expires and before the time to trigger expires, an indication of an adjusted timing for transmitting the measurement report.

In some examples, the measurement report manager 820 may transmit the measurement report to the base station based on the adjusted timing.

The adjusted TTT manager 825 may include, in the measurement report, an indication of an adjusted time to trigger based on the adjusted timing.

The measurement manager 830 may perform the one or more downlink measurements. In some examples, the measurement manager 830 may determine, based on performing the one or more downlink measurements, that one or more signal quality metrics satisfy the signal quality threshold for at least the signal quality measurement duration, where transmitting the indication of the adjusted timing for transmitting the measurement report is based on determining that the one or more signal quality metrics satisfy the signal quality threshold. In some cases, the one or more signal quality metrics include reference signal receive power, reference signal receive quality, or a combination thereof. In some cases, the signal quality measurement duration includes a time duration during which one or more signal metrics satisfy the signal quality threshold. In some cases, the downlink measurement unavailability duration includes a time duration during which the one or more downlink measurements are unavailable.

The subscription manager 835 may identify a high priority procedure to be performed on a second subscription. In some examples, the subscription manager 835 may tune, based on the high priority procedure, from a first radio frequency associated with the first subscription to a second radio frequency associated with a second subscription, where the downlink measurement unavailability duration is based on the tuning. In some cases, the one or more downlink measurements are associated with a first subscription.

The resource configuration manager 840 may identify a resource configuration associated with the time to trigger. In some examples, the resource configuration manager 840 may determine that one or more downlink transmission time intervals (TTIs) are disabled for the resource configuration. In some examples, the resource configuration manager 840 may determine, based on the one or more disabled downlink TTIs, the downlink measurement unavailability duration, where determining that the combination of the signal quality measurement duration and the downlink measurement unavailability duration exceeds the time to trigger is based on determining the downlink measurement unavailability duration.

The DRX manager 845 may identify a discontinuous reception cycle associated with the time to trigger. In some examples, the DRX manager 845 may determine, based on the discontinuous reception cycle, the downlink measurement unavailability duration, where determining that the combination of the signal quality measurement duration and the downlink measurement unavailability duration exceeds the time to trigger is based on determining the downlink measurement unavailability duration.

FIG. 9 shows a diagram of a system 900 including a device 905 that supports measurement reporting timing adjustments in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger, determine that a combination of a signal quality measurement duration and a downlink measurement unavailability duration exceeds the time to trigger, transmit, to the base station, after the minimum time to trigger threshold expires and before the time to trigger expires, an indication of an adjusted timing for transmitting the measurement report, and transmit the measurement report to the base station based on the adjusted timing.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting measurement reporting timing adjustments).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
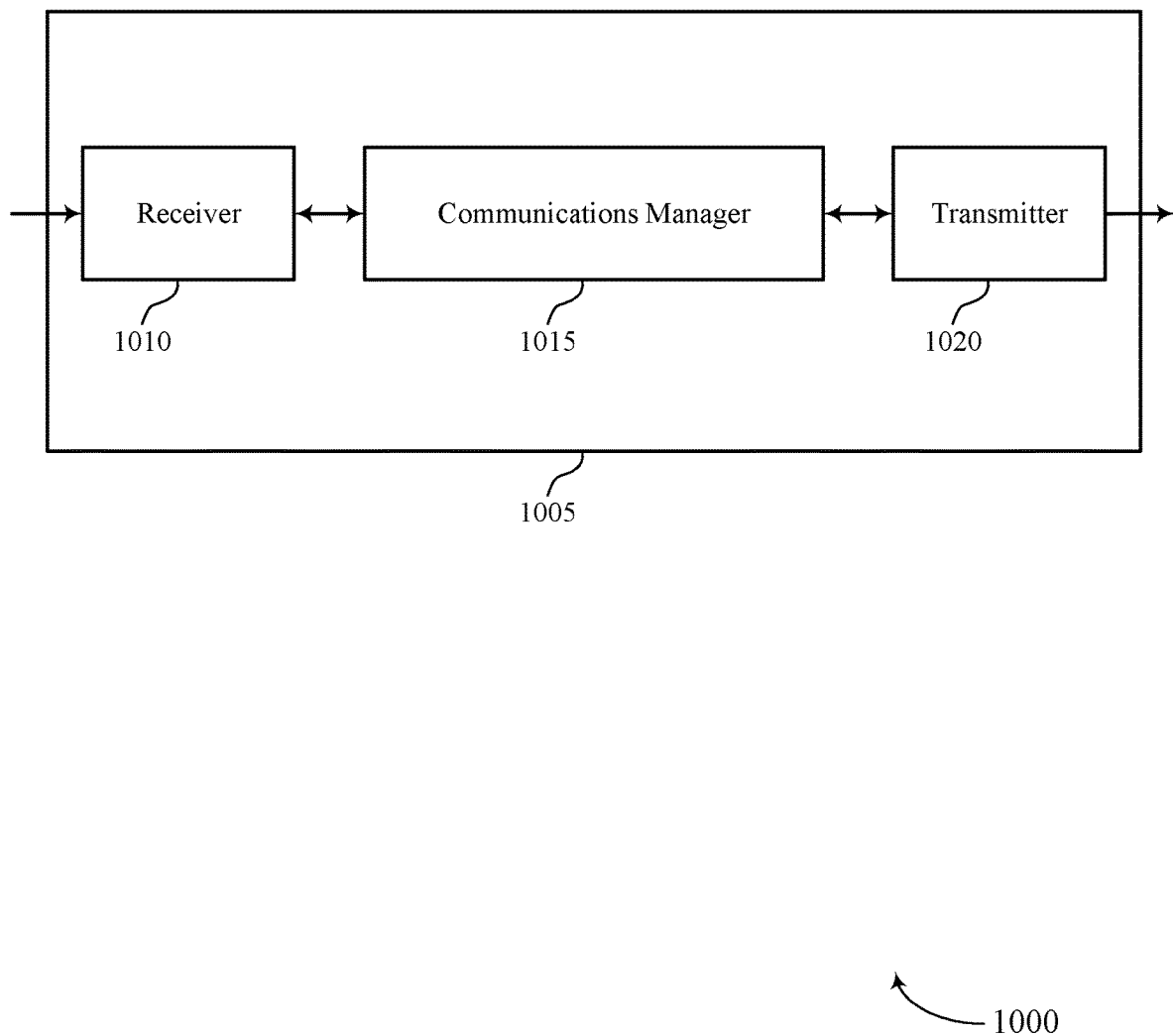
FIGS. 10 and 11 show block diagrams of devices that support measurement reporting timing adjustments in accordance with aspects of the present disclosure.

FIG. 10 shows a block diagram 1000 of a device 1005 that supports measurement reporting timing adjustments in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to measurement reporting timing adjustments, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, an indication that the UE is operating in a multi-subscriber identification module mode, adjust, based on the indication that the UE is operating in the multi-subscriber identification module mode, a configured time to trigger that triggers transmission of a measurement report upon one or more downlink measurements satisfying the signal quality threshold for the duration of the time to trigger, transmit, to the UE, an indication of an adjusted time to trigger based on the adjusting, and receive, upon expiration of the adjusted time to trigger, a measurement report from the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
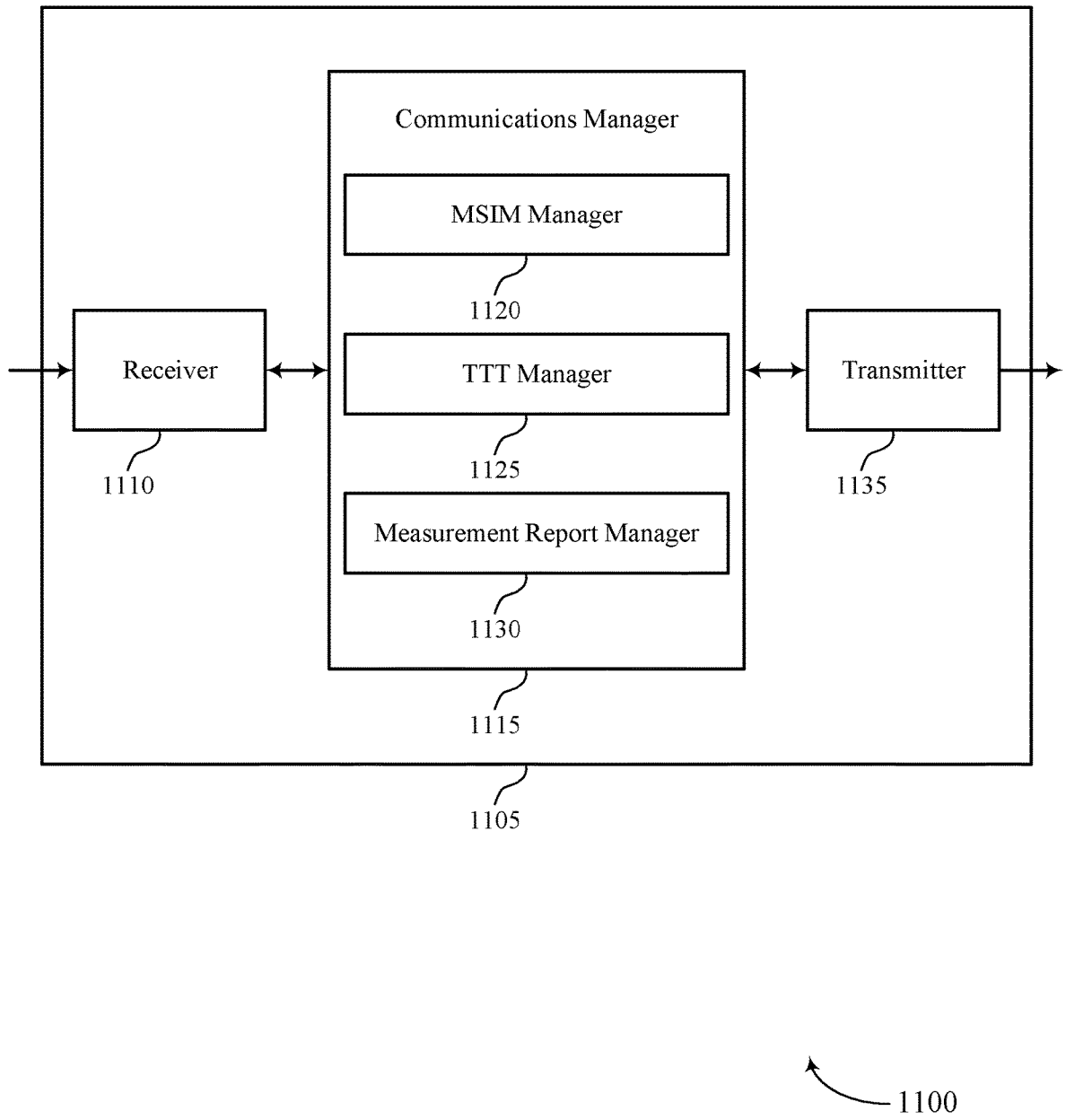

FIG. 11 shows a block diagram 1100 of a device 1105 that supports measurement reporting timing adjustments in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to measurement reporting timing adjustments, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a MSIM manager 1120, a TTT manager 1125, and a measurement report manager 1130. The communications manager 1115 may be an example of aspects of the communications manager 1310 described herein.

The MSIM manager 1120 may receive, from a UE, an indication that the UE is operating in a multi-subscriber identification module mode.

The TTT manager 1125 may adjust, based on the indication that the UE is operating in the multi-subscriber identification module mode, a configured time to trigger that triggers transmission of a measurement report upon one or more downlink measurements satisfying the signal quality threshold for the duration of the time to trigger and transmit, to the UE, an indication of an adjusted time to trigger based on the adjusting.

The measurement report manager 1130 may receive, upon expiration of the adjusted time to trigger, a measurement report from the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
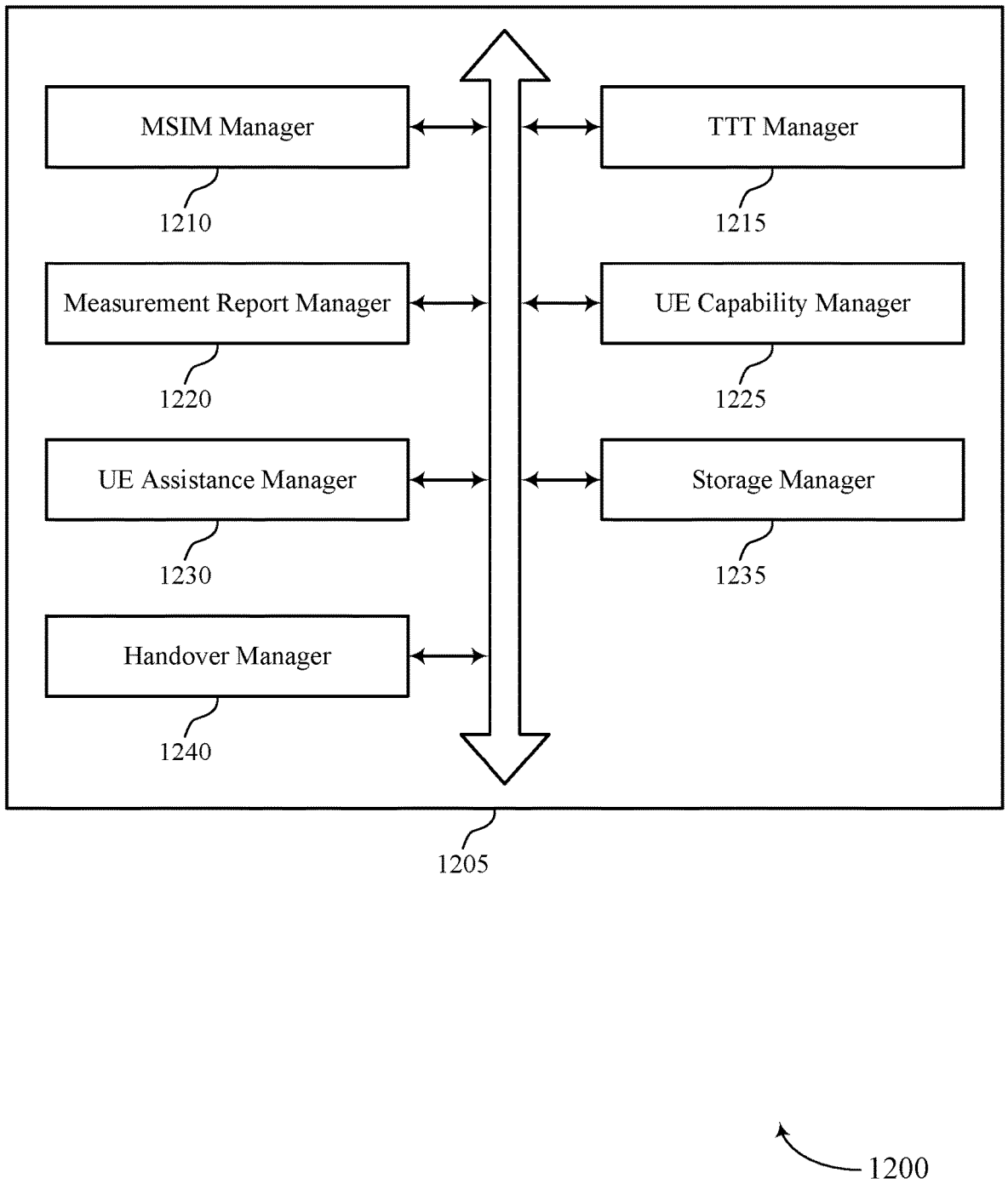
FIG. 12 shows a block diagram of a communications manager that supports measurement reporting timing adjustments in accordance with aspects of the present disclosure.

FIG. 12 shows a block diagram 1200 of a communications manager 1205 that supports measurement reporting timing adjustments in accordance with aspects of the present disclosure. The communications manager 1205 may be an example of aspects of a communications manager 1015, a communications manager 1115, or a communications manager 1310 described herein. The communications manager 1205 may include a MSIM manager 1210, a TTT manager 1215, a measurement report manager 1220, an UE capability manager 1225, an UE assistance manager 1230, a storage manager 1235, and a handover manager 1240. Each of these modules may communicate, directly or indirectly, with one another (e.g., via one or more buses).

The MSIM manager 1210 may receive, from a UE, an indication that the UE is operating in a multi-subscriber identification module mode.

The TTT manager 1215 may adjust, based on the indication that the UE is operating in the multi-subscriber identification module mode, a configured time to trigger that triggers transmission of a measurement report upon one or more downlink measurements satisfying the signal quality threshold for the duration of the time to trigger.

In some examples, the TTT manager 1215 may transmit, to the UE, an indication of an adjusted time to trigger based on the adjusting.

The measurement report manager 1220 may receive, upon expiration of the adjusted time to trigger, a measurement report from the UE.

The UE capability manager 1225 may receive uplink signaling including a UE radio capability information element. In some cases, the UE radio capability information element includes an indication of a multi-radio access technology dual connectivity capability. In some cases, the UE radio capability information element includes an indication of a multi-subscriber identification module capability. In some cases, the UE radio capability information element indicates a number of transmitters, receivers, or both, associated with or sharing one or more band combinations, or a combination thereof.

The UE assistance manager 1230 may receive a radio resource control message including UE assistance information, where the radio resource control message is associated with a first subscription. In some cases, the UE assistance information includes an indication of one or more resources used by the UE, the one or more resources associated with the first subscription and a second subscription. In some cases, the UE assistance information includes an indication of a paging cycle associated with the second subscription.

The storage manager 1235 may store, at the base station, the indication that the UE is operating in a multi-subscriber identification module mode.

The handover manager 1240 may perform a handover procedure for the UE from the base station to a second base station. In some examples, the handover manager 1240 may transmit, based on the handover procedure, the indication that the UE is operating in a multi-subscriber identification module mode to the second base station.

Figure 13:
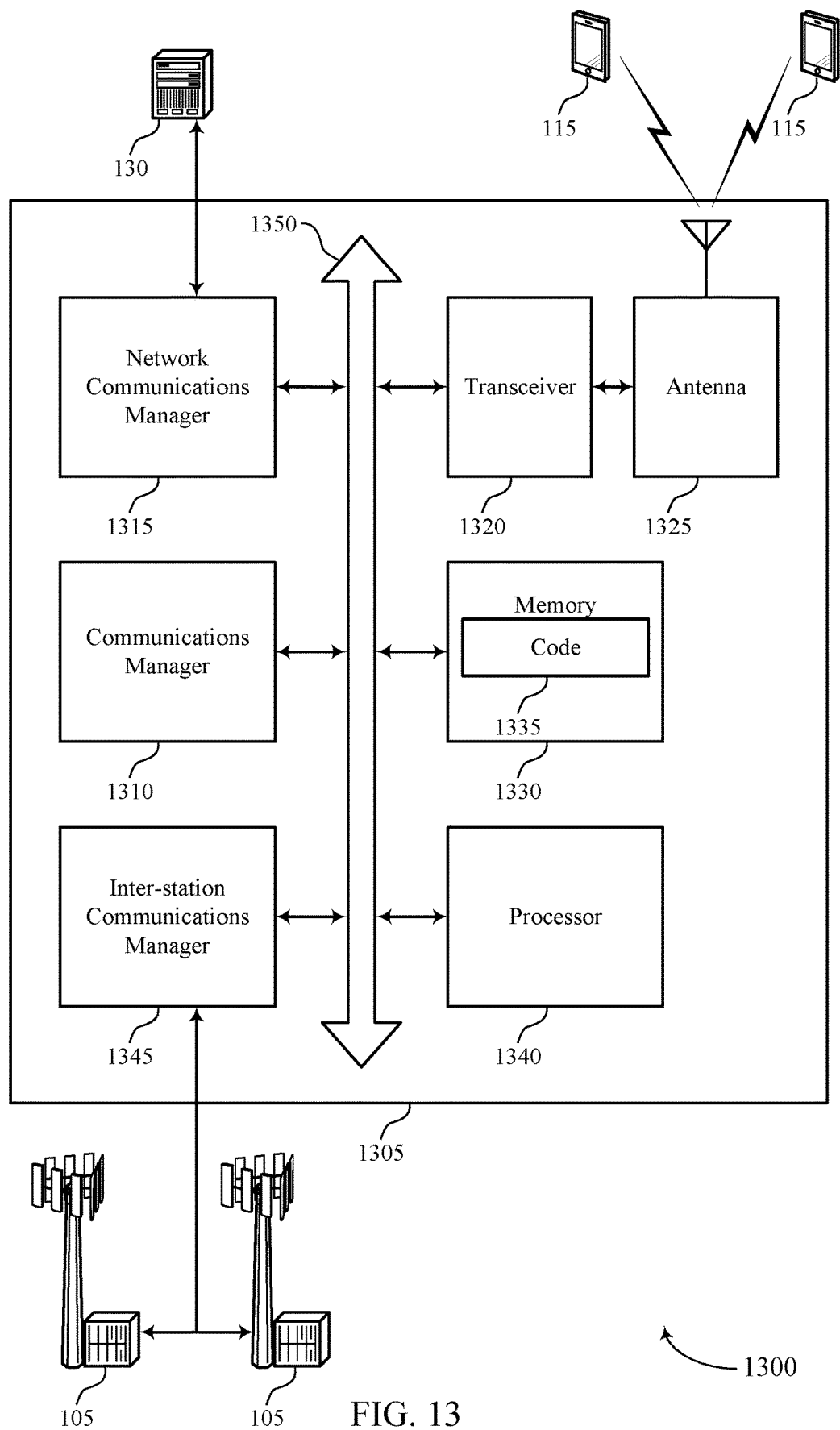
FIG. 13 shows a diagram of a system including a device that supports measurement reporting timing adjustments in accordance with aspects of the present disclosure.

FIG. 13 shows a diagram of a system 1300 including a device 1305 that supports measurement reporting timing adjustments in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, an indication that the UE is operating in a multi-subscriber identification module mode, adjust, based on the indication that the UE is operating in the multi-subscriber identification module mode, a configured time to trigger that triggers transmission of a measurement report upon one or more downlink measurements satisfying the signal quality threshold for the duration of the time to trigger, transmit, to the UE, an indication of an adjusted time to trigger based on the adjusting, and receive, upon expiration of the adjusted time to trigger, a measurement report from the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting measurement reporting timing adjustments).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
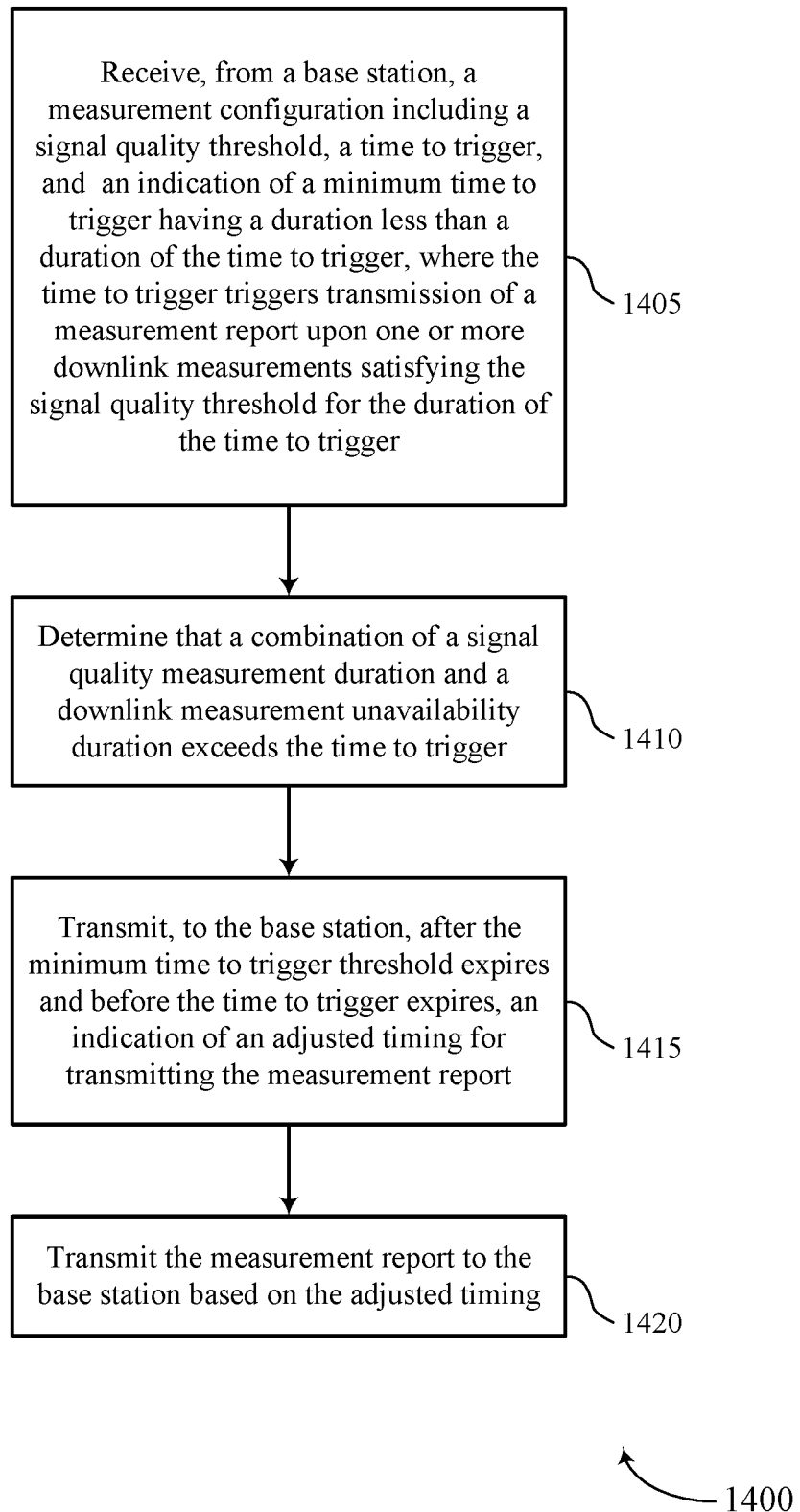
FIGS. 14 through 17 show flowcharts illustrating methods that support measurement reporting timing adjustments in accordance with aspects of the present disclosure.

FIG. 14 shows a flowchart illustrating a method 1400 that supports measurement reporting timing adjustments in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger. The operations of 1405 may be performed according to the methods described herein. In some examples, aspects of the operations of 1405 may be performed by a measurement configuration manager as described with reference to FIGS. 6 through 9.

At 1410, the UE may determine that a combination of a signal quality measurement duration and a downlink measurement unavailability duration exceeds the time to trigger. The operations of 1410 may be performed according to the methods described herein. In some examples, aspects of the operations of 1410 may be performed by a TTT manager as described with reference to FIGS. 6 through 9.

At 1415, the UE may transmit, to the base station, after the minimum time to trigger threshold expires and before the time to trigger expires, an indication of an adjusted timing for transmitting the measurement report. The operations of 1415 may be performed according to the methods described herein. In some examples, aspects of the operations of 1415 may be performed by a measurement report manager as described with reference to FIGS. 6 through 9.

At 1420, the UE may transmit the measurement report to the base station based on the adjusted timing. The operations of 1420 may be performed according to the methods described herein. In some examples, aspects of the operations of 1420 may be performed by a measurement report manager as described with reference to FIGS. 6 through 9.

Figure 15:
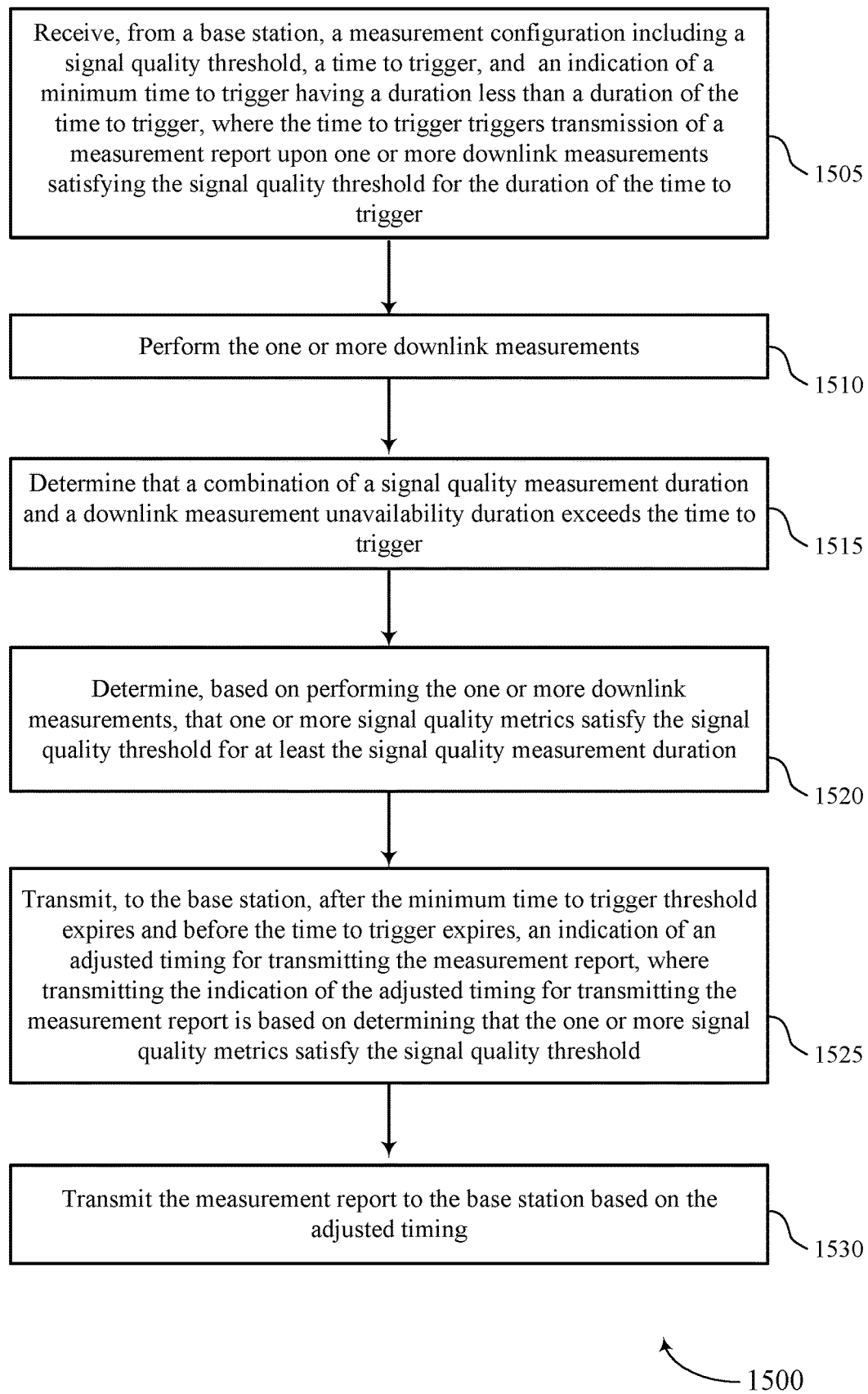

FIG. 15 shows a flowchart illustrating a method 1500 that supports measurement reporting timing adjustments in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, a measurement configuration including a signal quality threshold, a time to trigger, and an indication of a minimum time to trigger having a duration less than a duration of the time to trigger, where the time to trigger triggers transmission of a measurement report upon one or more downlink measurements satisfying the signal quality threshold for the duration of the time to trigger. The operations of 1505 may be performed according to the methods described herein. In some examples, aspects of the operations of 1505 may be performed by a measurement configuration manager as described with reference to FIGS. 6 through 9.

At 1510, the UE may perform the one or more downlink measurements. The operations of 1510 may be performed according to the methods described herein. In some examples, aspects of the operations of 1510 may be performed by a measurement manager as described with reference to FIGS. 6 through 9.

At 1515, the UE may determine that a combination of a signal quality measurement duration and a downlink measurement unavailability duration exceeds the time to trigger. The operations of 1515 may be performed according to the methods described herein. In some examples, aspects of the operations of 1515 may be performed by a TTT manager as described with reference to FIGS. 6 through 9.

At 1520, the UE may determine, based on performing the one or more downlink measurements, that one or more signal quality metrics satisfy the signal quality threshold for at least the signal quality measurement duration. The operations of 1520 may be performed according to the methods described herein. In some examples, aspects of the operations of 1520 may be performed by a measurement manager as described with reference to FIGS. 6 through 9.

At 1525, the UE may transmit, to the base station, after the minimum time to trigger threshold expires and before the time to trigger expires, an indication of an adjusted timing for transmitting the measurement report, where transmitting the indication of the adjusted timing for transmitting the measurement report is based on determining that the one or more signal quality metrics satisfy the signal quality threshold. The operations of 1525 may be performed according to the methods described herein. In some examples, aspects of the operations of 1525 may be performed by a measurement report manager as described with reference to FIGS. 6 through 9.

At 1530, the UE may transmit the measurement report to the base station based on the adjusted timing. The operations of 1530 may be performed according to the methods described herein. In some examples, aspects of the operations of 1530 may be performed by a measurement report manager as described with reference to FIGS. 6 through 9.

Figure 16:
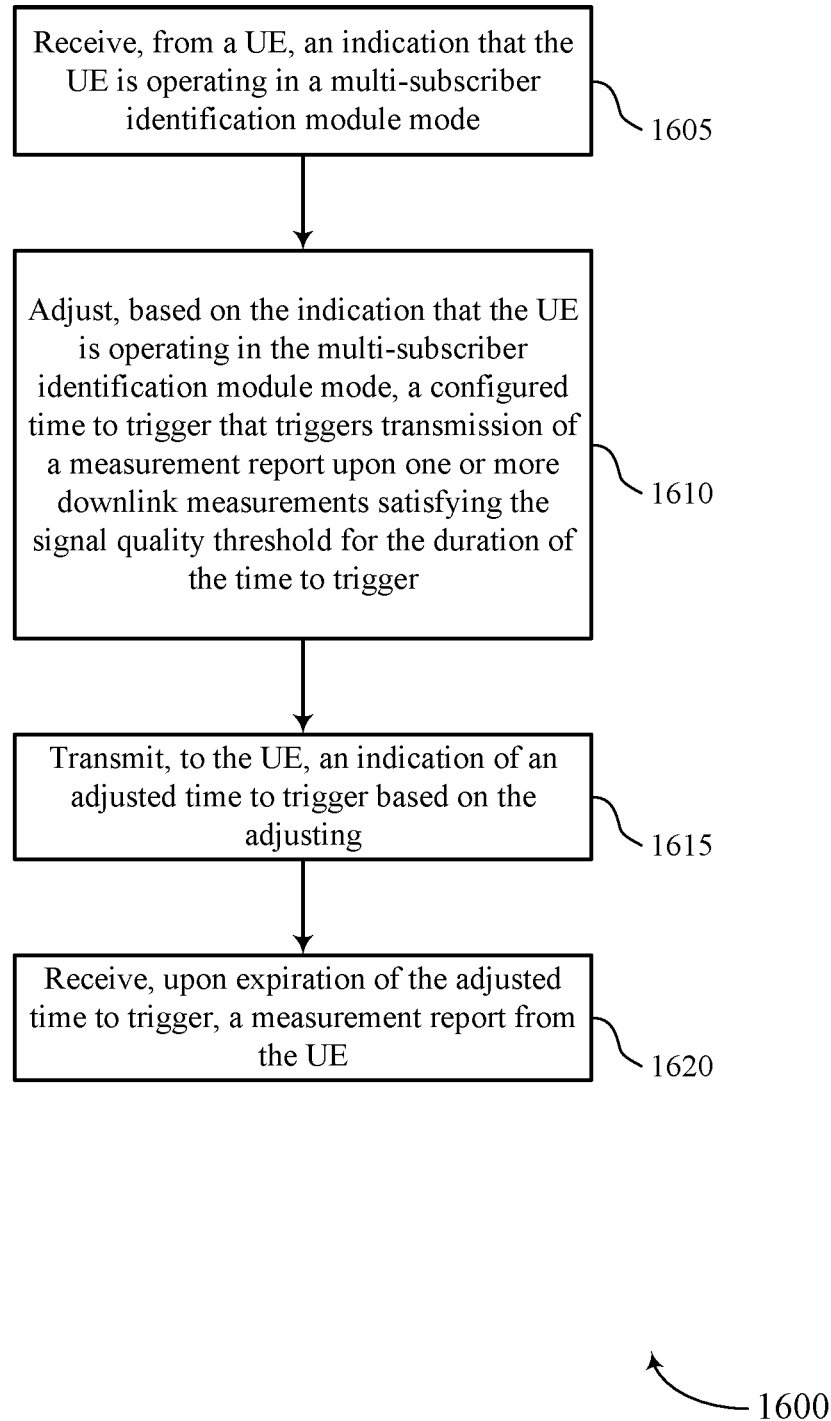

FIG. 16 shows a flowchart illustrating a method 1600 that supports measurement reporting timing adjustments in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1605, the base station may receive, from a UE, an indication that the UE is operating in a multi-subscriber identification module mode. The operations of 1605 may be performed according to the methods described herein. In some examples, aspects of the operations of 1605 may be performed by a MSIM manager as described with reference to FIGS. 10 through 13.

At 1610, the base station may adjust, based on the indication that the UE is operating in the multi-subscriber identification module mode, a configured time to trigger that triggers transmission of a measurement report upon one or more downlink measurements satisfying the signal quality threshold for the duration of the time to trigger. The operations of 1610 may be performed according to the methods described herein. In some examples, aspects of the operations of 1610 may be performed by a TTT manager as described with reference to FIGS. 10 through 13.

At 1615, the base station may transmit, to the UE, an indication of an adjusted time to trigger based on the adjusting. The operations of 1615 may be performed according to the methods described herein. In some examples, aspects of the operations of 1615 may be performed by a TTT manager as described with reference to FIGS. 10 through 13.

At 1620, the base station may receive, upon expiration of the adjusted time to trigger, a measurement report from the UE. The operations of 1620 may be performed according to the methods described herein. In some examples, aspects of the operations of 1620 may be performed by a measurement report manager as described with reference to FIGS. 10 through 13.

Figure 17:
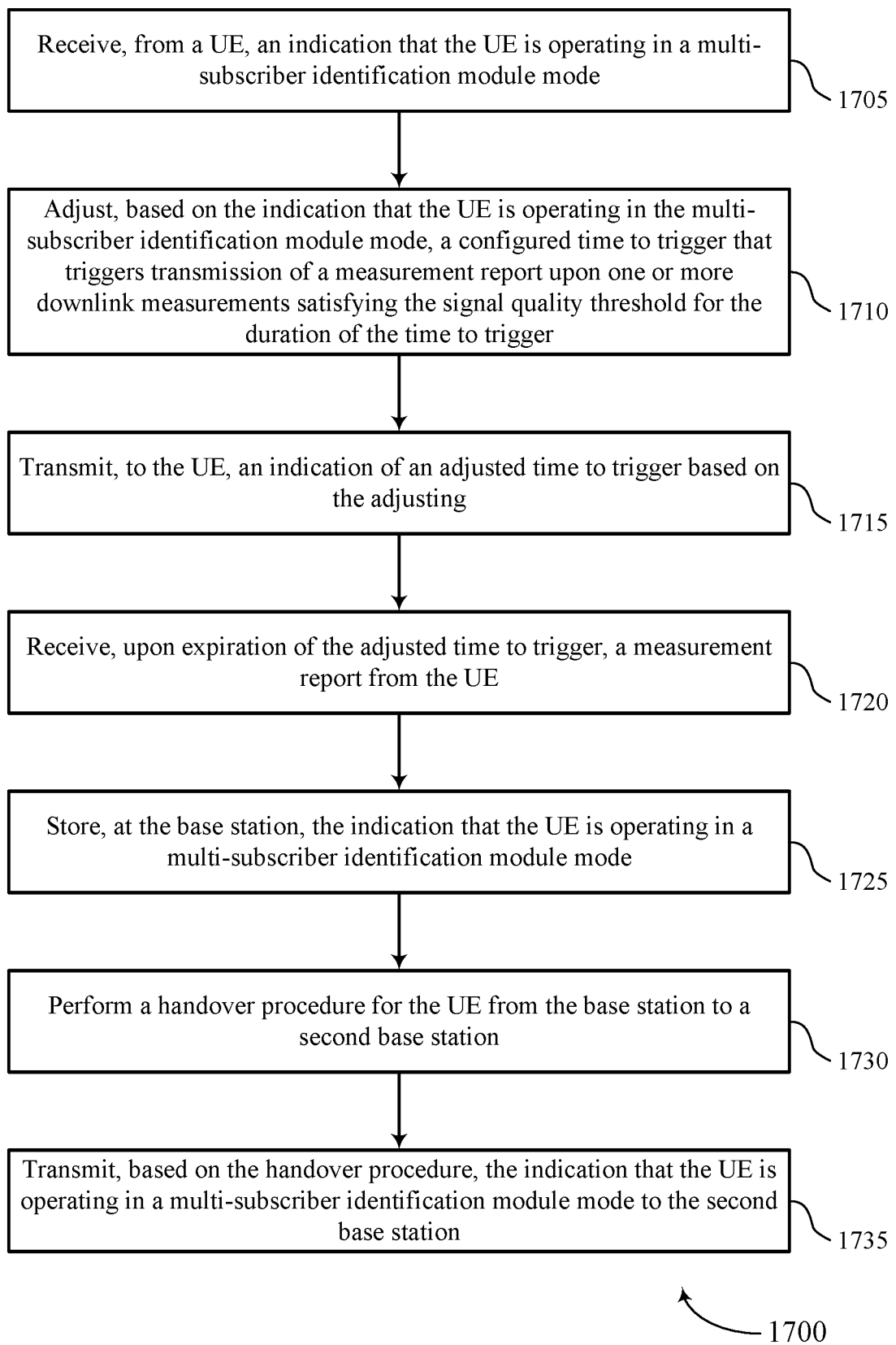

FIG. 17 shows a flowchart illustrating a method 1700 that supports measurement reporting timing adjustments in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1705, the base station may receive, from a UE, an indication that the UE is operating in a multi-subscriber identification module mode. The operations of 1705 may be performed according to the methods described herein. In some examples, aspects of the operations of 1705 may be performed by a MSIM manager as described with reference to FIGS. 10 through 13.

At 1710, the base station may adjust, based on the indication that the UE is operating in the multi-subscriber identification module mode, a configured time to trigger that triggers transmission of a measurement report upon one or more downlink measurements satisfying the signal quality threshold for the duration of the time to trigger. The operations of 1710 may be performed according to the methods described herein. In some examples, aspects of the operations of 1710 may be performed by a TTT manager as described with reference to FIGS. 10 through 13.

At 1715, the base station may transmit, to the UE, an indication of an adjusted time to trigger based on the adjusting. The operations of 1715 may be performed according to the methods described herein. In some examples, aspects of the operations of 1715 may be performed by a TTT manager as described with reference to FIGS. 10 through 13.

At 1720, the base station may receive, upon expiration of the adjusted time to trigger, a measurement report from the UE. The operations of 1720 may be performed according to the methods described herein. In some examples, aspects of the operations of 1720 may be performed by a measurement report manager as described with reference to FIGS. 10 through 13.

At 1725, the base station may store, at the base station, the indication that the UE is operating in a multi-subscriber identification module mode. The operations of 1725 may be performed according to the methods described herein. In some examples, aspects of the operations of 1725 may be performed by a storage manager as described with reference to FIGS. 10 through 13.

At 1730, the base station may perform a handover procedure for the UE from the base station to a second base station. The operations of 1730 may be performed according to the methods described herein. In some examples, aspects of the operations of 1730 may be performed by a handover manager as described with reference to FIGS. 10 through 13.

At 1735, the base station may transmit, based on the handover procedure, the indication that the UE is operating in a multi-subscriber identification module mode to the second base station. The operations of 1735 may be performed according to the methods described herein. In some examples, aspects of the operations of 1735 may be performed by a handover manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, from a base station, a measurement configuration comprising a signal quality threshold, a time to trigger, and an indication of a minimum time to trigger having a duration less than a duration of the time to trigger, wherein the time to trigger triggers transmission of a measurement report upon one or more downlink measurements satisfying the signal quality threshold for the duration of the time to trigger;
   determining that a combination of a signal quality measurement duration and a downlink measurement unavailability duration exceeds the time to trigger;
   transmitting, to the base station, after the minimum time to trigger threshold expires and before the time to trigger expires, an indication of an adjusted timing for transmitting the measurement report; and transmitting the measurement report to the base station based at least in part on the adjusted timing.

2. The method of claim 1, wherein transmitting the measurement report to the base station comprises:
including, in the measurement report, an indication of an adjusted time to trigger based at least in part on the adjusted timing.

3. The method of claim 1, further comprising:
performing the one or more downlink measurements; and
determining, based at least in part on performing the one or more downlink measurements, that one or more signal quality metrics satisfy the signal quality threshold for at least the signal quality measurement duration, wherein transmitting the indication of the adjusted timing for transmitting the measurement report is based at least in part on determining that the one or more signal quality metrics satisfy the signal quality threshold.

4. The method of claim 3, wherein the one or more signal quality metrics comprise reference signal receive power, reference signal receive quality, or a combination thereof.

5. The method of claim 1, wherein the signal quality measurement duration comprises a time duration during which one or more signal metrics satisfy the signal quality threshold.

6. The method of claim 1, wherein the downlink measurement unavailability duration comprises a time duration during which the one or more downlink measurements are unavailable.

7. The method of claim 1, wherein the one or more downlink measurements are associated with a first subscription.

8. The method of claim 7, further comprising:
identifying a high priority procedure to be performed on a second subscription; and
tuning, based at least in part on the high priority procedure, from a first radio frequency associated with the first subscription to a second radio frequency associated with the second subscription, wherein the downlink measurement unavailability duration is based at least in part on the tuning.

9. The method of claim 1, further comprising:
identifying a resource configuration associated with the time to trigger;
determining that one or more downlink transmission time intervals (TTIs) are disabled for the resource configuration; and
determining, based at least in part on the one or more disabled downlink TTIs, the downlink measurement unavailability duration, wherein determining that the combination of the signal quality measurement duration and the downlink measurement unavailability duration exceeds the time to trigger is based at least in part on determining the downlink measurement unavailability duration.

10. The method of claim 1, further comprising:
identifying a discontinuous reception cycle associated with the time to trigger; and
determining, based at least in part on the discontinuous reception cycle, the downlink measurement unavailability duration, wherein determining that the combination of the signal quality measurement duration and the downlink measurement unavailability duration exceeds the time to trigger is based at least in part on determining the downlink measurement unavailability duration.

11. An apparatus for wireless communications at a user equipment (UE), comprising:
a processor,
memory coupled with the processor; and
instructions stored in the memory and executable by the processor to cause the apparatus to:
receive, from a base station, a measurement configuration comprising a signal quality threshold, a time to trigger, and an indication of a minimum time to trigger having a duration less than a duration of the time to trigger, wherein the time to trigger triggers transmission of a measurement report upon one or more downlink measurements satisfying the signal quality threshold for the duration of the time to trigger;
determine that a combination of a signal quality measurement duration and a downlink measurement unavailability duration exceeds the time to trigger;
transmit, to the base station, after the minimum time to trigger threshold expires and before the time to trigger expires, an indication of an adjusted timing for transmitting the measurement report; and
transmit the measurement report to the base station based at least in part on the adjusted timing.

12. The apparatus of claim 11, wherein the instructions to transmit the measurement report to the base station are executable by the processor to cause the apparatus to:
include, in the measurement report, an indication of an adjusted time to trigger based at least in part on the adjusted timing.

13. The apparatus of claim 11, wherein the instructions are further executable by the processor to cause the apparatus to:
perform the one or more downlink measurements; and
determine, based at least in part on performing the one or more downlink measurements, that one or more signal quality metrics satisfy the signal quality threshold for at least the signal quality measurement duration, wherein transmitting the indication of the adjusted timing for transmitting the measurement report is based at least in part on determining that the one or more signal quality metrics satisfy the signal quality threshold.

14. The apparatus of claim 13, wherein the one or more signal quality metrics comprise reference signal receive power, reference signal receive quality, or a combination thereof.

15. The apparatus of claim 11, wherein the signal quality measurement duration comprises a time duration during which one or more signal metrics satisfy the signal quality threshold.

16. The apparatus of claim 11, wherein the downlink measurement unavailability duration comprises a time duration during which the one or more downlink measurements are unavailable.

17. The apparatus of claim 11, wherein the one or more downlink measurements are associated with a first subscription.

18. The apparatus of claim 17, wherein the instructions are further executable by the processor to cause the apparatus to:
identify a high priority procedure to be performed on a second subscription; and
tune, based at least in part on the high priority procedure, from a first radio frequency associated with the first subscription to a second radio frequency associated with the second subscription, wherein the downlink measurement unavailability duration is based at least in part on the tuning.

19. The apparatus of claim 11, wherein the instructions are further executable by the processor to cause the apparatus to:
- identify a resource configuration associated with the time to trigger;
- determine that one or more downlink transmission time intervals (TTIs) are disabled for the resource configuration; and
- determine, based at least in part on the one or more disabled downlink TTIs, the downlink measurement unavailability duration, wherein determining that the combination of the signal quality measurement duration and the downlink measurement unavailability duration exceeds the time to trigger is based at least in part on determining the downlink measurement unavailability duration.

20. The apparatus of claim 11, wherein the instructions are further executable by the processor to cause the apparatus to:
- identify a discontinuous reception cycle associated with the time to trigger; and
- determine, based at least in part on the discontinuous reception cycle, the downlink measurement unavailability duration, wherein determining that the combination of the signal quality measurement duration and the downlink measurement unavailability duration exceeds the time to trigger is based at least in part on determining the downlink measurement unavailability duration.

21. A non-transitory computer-readable medium storing code for wireless communications by a user equipment (UE), the code comprising instructions executable by one or more processors to:
- receive, from a base station, a measurement configuration comprising a signal quality threshold, a time to trigger, and an indication of a minimum time to trigger having a duration less than a duration of the time to trigger, wherein the time to trigger triggers transmission of a measurement report upon one or more downlink measurements satisfying the signal quality threshold for the duration of the time to trigger;
- determine that a combination of a signal quality measurement duration and a downlink measurement unavailability duration exceeds the time to trigger;
- transmit, to the base station, after the minimum time to trigger threshold expires and before the time to trigger expires, an indication of an adjusted timing for transmitting the measurement report; and
- transmit the measurement report to the base station based at least in part on the adjusted timing.

22. The non-transitory computer-readable medium of claim 21, wherein the instructions to transmit the measurement report to the base station are executable by the one or more processors to:
- include, in the measurement report, an indication of an adjusted time to trigger based at least in part on the adjusted timing.

23. The non-transitory computer-readable medium of claim 21, wherein the instructions are further executable by the one or more processors to:
- perform the one or more downlink measurements; and
- determine, based at least in part on performing the one or more downlink measurements, that one or more signal quality metrics satisfy the signal quality threshold for at least the signal quality measurement duration, wherein transmitting the indication of the adjusted timing for transmitting the measurement report is based at least in part on determining that the one or more signal quality metrics satisfy the signal quality threshold.

24. The non-transitory computer-readable medium of claim 23, wherein the one or more signal quality metrics comprise reference signal receive power, reference signal receive quality, or a combination thereof.

25. The non-transitory computer-readable medium of claim 21, wherein the signal quality measurement duration comprises a time duration during which one or more signal metrics satisfy the signal quality threshold.

26. The non-transitory computer-readable medium of claim 21, wherein the downlink measurement unavailability duration comprises a time duration during which the one or more downlink measurements are unavailable.

27. The non-transitory computer-readable medium of claim 21, wherein the one or more downlink measurements are associated with a first subscription.

28. The non-transitory computer-readable medium of claim 27, wherein the instructions are further executable by the one or more processors to:
- identify a high priority procedure to be performed on a second subscription; and
- tuning, based at least in part on the high priority procedure, from a first radio frequency associated with the first subscription to a second radio frequency associated with the second subscription, wherein the downlink measurement unavailability duration is based at least in part on the tuning.

29. The non-transitory computer-readable medium of claim 21, wherein the instructions are further executable by the one or more processors to:
- identify a resource configuration associated with the time to trigger;
- determine that one or more downlink transmission time intervals (TTIs) are disabled for the resource configuration; and
- determine, based at least in part on the one or more disabled downlink TTIs, the downlink measurement unavailability duration, wherein determining that the combination of the signal quality measurement duration and the downlink measurement unavailability duration exceeds the time to trigger is based at least in part on determining the downlink measurement unavailability duration.

\* \* \* \* \*